(12) United States Patent
Napau et al.

(10) Patent No.: US 12,496,937 B2
(45) Date of Patent: Dec. 16, 2025

(54) VEHICLE SEAT ADJUSTMENT SYSTEM WITH POWER LONG RAILS

(71) Applicant: Fisher & Company, Incorporated, St. Clair Shores, MI (US)

(72) Inventors: Mircea Napau, Sterling Heights, MI (US); Ileana Dacia Napau, Cugir (RO); Ioan Napau, Rochester Hills, MI (US); Sapan Mahendra Poptani, Northville, MI (US); Ryan Martin, Macomb, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 164 days.

(21) Appl. No.: 18/377,894

(22) Filed: Oct. 9, 2023

(65) Prior Publication Data

US 2024/0123871 A1  Apr. 18, 2024

Related U.S. Application Data

(60) Provisional application No. 63/444,667, filed on Feb. 10, 2023, provisional application No. 63/415,470, filed on Oct. 12, 2022.

(51) Int. Cl.
*B60N 2/06* (2006.01)
*B60N 2/02* (2006.01)
*B60N 2/07* (2006.01)

(52) U.S. Cl.
CPC ......... *B60N 2/067* (2013.01); *B60N 2/02253* (2023.08); *B60N 2/0702* (2013.01); *B60N 2/06* (2013.01); *B60N 2/07* (2013.01)

(58) Field of Classification Search
CPC . B60N 2/06; B60N 2/067; B60N 2/07; B60N 2/02253; B60N 2/0702
See application file for complete search history.

(56) References Cited

U.S. PATENT DOCUMENTS

| | | | |
|---|---|---|---|
| 546,249 | A | 9/1895 | Regan |
| 657,542 | A | 9/1900 | Ingersoll |
| 978,371 | A | 12/1910 | Harrison |
| 1,192,627 | A | 7/1916 | Hatlee |

(Continued)

FOREIGN PATENT DOCUMENTS

| | | | |
|---|---|---|---|
| CN | 87101620 A | 9/1988 | |
| CN | 1109566 A | 10/1995 | |

(Continued)

OTHER PUBLICATIONS

Final Office Action regarding U.S. Appl. No. 18/378,770 dated Mar. 24, 2025.

(Continued)

*Primary Examiner* — Rodney B White
(74) *Attorney, Agent, or Firm* — Harness, Dickey & Pierce, P.L.C.

(57) ABSTRACT

A power rail system for a vehicle seat includes an outer track defining an elongated channel with an elongated lead screw mounted in the channel. An inner track is received in the elongated channel and a power length adjuster gear transmission is mounted to the inner track and drivingly engaged with the elongated lead screw. A seat structure is mounted to the inner track for movement along the power rail system.

20 Claims, 20 Drawing Sheets

(56) References Cited

U.S. PATENT DOCUMENTS

| | | | |
|---|---|---|---|
| 1,694,031 A | 12/1928 | Braren | |
| 1,770,035 A | 7/1930 | Heap et al. | |
| 2,168,164 A | 8/1939 | Kittredge | |
| 2,170,951 A | 8/1939 | Perry | |
| 2,250,259 A | 7/1941 | Foote, Jr. | |
| 2,475,504 A | 7/1949 | Atwater | |
| 2,508,121 A | 5/1950 | Mciver | |
| 2,609,713 A | 9/1952 | Martin | |
| 2,972,910 A | 2/1961 | Menge, Sr. | |
| 2,995,226 A | 8/1961 | Gilder | |
| 3,013,447 A | 12/1961 | Hils et al. | |
| 3,037,400 A | 6/1962 | Sundt | |
| 3,144,791 A | 8/1964 | Menge, Sr. | |
| 3,319,482 A | 5/1967 | Campbell et al. | |
| 3,427,901 A | 2/1969 | Wildhaber | |
| 3,451,290 A | 6/1969 | Wildhaber | |
| 3,965,773 A | 6/1976 | Bert et al. | |
| 4,023,441 A | 5/1977 | Osterwalder | |
| 4,228,698 A | 10/1980 | Winiasz | |
| 4,228,739 A | 10/1980 | Fitzgibbon | |
| 4,269,075 A | 5/1981 | Crist et al. | |
| 4,452,102 A | 6/1984 | Shaffer | |
| 4,720,073 A | 1/1988 | Mann et al. | |
| 4,721,337 A | 1/1988 | Tomita | |
| 4,805,866 A | 2/1989 | Aihara et al. | |
| 4,884,844 A | 12/1989 | Kershaw et al. | |
| 4,930,367 A | 6/1990 | Nagasawa | |
| 4,967,615 A | 11/1990 | Mills | |
| 5,030,184 A | 7/1991 | Rennerfelt | |
| 5,094,420 A | 3/1992 | Aihara et al. | |
| 5,099,717 A | 3/1992 | Ochiai et al. | |
| 5,222,402 A | 6/1993 | White et al. | |
| 5,259,257 A | 11/1993 | Mouri | |
| 5,292,164 A | 3/1994 | Rees | |
| 5,314,158 A | 5/1994 | Mouri | |
| 5,349,878 A | 9/1994 | White et al. | |
| 5,425,683 A | 6/1995 | Bang | |
| 5,505,668 A | 4/1996 | Koriakov-Savoysky et al. | |
| 5,598,746 A | 2/1997 | Chen | |
| 5,701,783 A | 12/1997 | Lin | |
| 5,816,555 A | 10/1998 | Ito et al. | |
| 5,865,506 A | 2/1999 | Sakamoto | |
| 6,032,550 A | 3/2000 | Rugh | |
| 6,138,974 A | 10/2000 | Okada et al. | |
| D437,334 S | 2/2001 | Song | |
| 6,220,642 B1 | 4/2001 | Ito et al. | |
| 6,244,660 B1 * | 6/2001 | Yoshimatsu | B60N 2/067 297/344.1 X |
| 6,260,672 B1 | 7/2001 | Frohnhaus et al. | |
| 6,260,922 B1 | 7/2001 | Frohnhaus et al. | |
| 6,261,199 B1 | 7/2001 | Schlangen | |
| 6,322,146 B1 | 11/2001 | Fisher, Jr. | |
| 6,548,332 B2 | 4/2003 | Peng et al. | |
| 6,742,409 B2 | 6/2004 | Blanchard | |
| 6,820,851 B2 * | 11/2004 | Mochizuki | B60N 2/067 248/429 |
| 6,915,998 B2 | 7/2005 | Borbe et al. | |
| 6,986,493 B2 * | 1/2006 | Yokota | B60N 2/0875 248/429 X |
| 7,041,024 B2 | 5/2006 | Becker et al. | |
| 7,048,244 B2 | 5/2006 | Hauck | |
| 7,051,986 B1 | 5/2006 | Taubmann et al. | |
| 7,143,513 B2 | 12/2006 | Taubmann et al. | |
| 7,198,243 B2 | 4/2007 | Hofschulte et al. | |
| 7,313,982 B2 | 1/2008 | Wisner et al. | |
| 7,322,257 B2 | 1/2008 | Becker et al. | |
| 7,340,974 B2 | 3/2008 | Landskron et al. | |
| 7,437,962 B2 | 10/2008 | Taubmann et al. | |
| 7,571,666 B2 | 8/2009 | Borbe et al. | |
| 7,703,347 B2 | 4/2010 | Porinsky et al. | |
| 7,887,020 B2 | 2/2011 | Ferguson et al. | |
| 8,061,228 B2 | 11/2011 | Becker et al. | |
| 8,061,756 B2 * | 11/2011 | Kimata | B60N 2/067 248/429 X |
| 8,087,974 B2 | 1/2012 | Maeda et al. | |
| 8,113,074 B2 | 2/2012 | Wohrle et al. | |
| 8,128,051 B2 | 3/2012 | Koga et al. | |
| 8,171,823 B2 | 5/2012 | Koga et al. | |
| 8,453,529 B2 | 6/2013 | Birker et al. | |
| 8,485,489 B2 | 7/2013 | Hofschulte et al. | |
| 8,548,687 B2 * | 10/2013 | Jefferies | B60N 2/067 701/1 |
| 8,777,794 B2 | 7/2014 | Oishi | |
| 8,826,756 B2 | 9/2014 | Hoffmann et al. | |
| 8,864,231 B2 | 10/2014 | Shimoda et al. | |
| 8,904,895 B2 | 12/2014 | Woehrle et al. | |
| 8,998,324 B2 * | 4/2015 | Kitaguchi | B60N 2/0031 297/344.1 X |
| 9,079,511 B2 * | 7/2015 | Jefferies | B60N 2/067 |
| 9,145,068 B2 * | 9/2015 | Bosecker | B60N 2/4214 |
| 9,180,795 B2 | 11/2015 | Flieger et al. | |
| 9,205,763 B2 | 12/2015 | Anticuar et al. | |
| 9,415,713 B2 | 8/2016 | Line et al. | |
| 9,421,891 B2 | 8/2016 | Andres et al. | |
| 9,604,550 B2 * | 3/2017 | Ito | B60N 2/0228 |
| 9,689,464 B2 | 6/2017 | Hamakita | |
| 9,694,724 B2 | 7/2017 | Nagata et al. | |
| 9,827,879 B2 | 11/2017 | Fujita et al. | |
| 9,902,295 B2 | 2/2018 | Napau et al. | |
| 10,021,991 B2 | 7/2018 | Klimm | |
| 10,024,392 B2 | 7/2018 | Napau et al. | |
| 10,195,975 B2 | 2/2019 | Becker et al. | |
| 10,208,835 B2 | 2/2019 | Noguchi et al. | |
| 10,220,730 B2 | 3/2019 | Nagata et al. | |
| 10,220,732 B2 | 3/2019 | Auer et al. | |
| 10,300,812 B2 | 5/2019 | Flieger et al. | |
| 10,336,217 B2 | 7/2019 | Ikeda | |
| 10,369,912 B2 | 8/2019 | Asai et al. | |
| 10,486,554 B2 | 11/2019 | Napau et al. | |
| 10,500,984 B2 | 12/2019 | Hoffmann | |
| 10,562,411 B2 | 2/2020 | Higuchi et al. | |
| 10,737,591 B2 | 8/2020 | Ito | |
| 10,843,591 B2 | 11/2020 | Becker et al. | |
| 10,857,910 B2 | 12/2020 | Madhu | |
| 10,882,567 B2 * | 1/2021 | Schulz | B64D 11/0696 |
| 10,933,771 B2 | 3/2021 | Geiges et al. | |
| 10,953,772 B2 | 3/2021 | Napau et al. | |
| 11,077,774 B2 | 8/2021 | Napau et al. | |
| 11,180,064 B2 | 11/2021 | Navatte et al. | |
| 11,273,506 B2 | 3/2022 | Napau et al. | |
| 11,485,255 B2 | 11/2022 | Napau et al. | |
| 11,529,892 B2 | 12/2022 | Napau et al. | |
| 2003/0080599 A1 | 5/2003 | Hohn et al. | |
| 2004/0206195 A1 | 10/2004 | Landskron et al. | |
| 2004/0254041 A1 | 12/2004 | Becker et al. | |
| 2005/0082890 A1 | 4/2005 | Taubmann et al. | |
| 2005/0116132 A1 | 6/2005 | Sakamaki | |
| 2005/0126333 A1 | 6/2005 | Dohles et al. | |
| 2005/0146174 A1 | 7/2005 | Maddelein et al. | |
| 2005/0253036 A1 | 11/2005 | Li et al. | |
| 2005/0269478 A1 | 12/2005 | Woehrle et al. | |
| 2006/0084547 A1 | 4/2006 | Dill et al. | |
| 2006/0117885 A1 | 6/2006 | Robson et al. | |
| 2006/0213302 A1 | 9/2006 | Hoffmann et al. | |
| 2006/0249644 A1 | 11/2006 | Folliot et al. | |
| 2007/0029893 A1 | 2/2007 | Schuler et al. | |
| 2007/0108360 A1 | 5/2007 | Ito et al. | |
| 2007/0209857 A1 | 9/2007 | Wolf | |
| 2007/0241602 A1 | 10/2007 | Thiel et al. | |
| 2008/0197654 A1 * | 8/2008 | Livesey | B60N 2/067 297/344.11 X |
| 2008/0261743 A1 | 10/2008 | Junkers | |
| 2009/0045661 A1 | 2/2009 | Stoessel et al. | |
| 2010/0139425 A1 | 6/2010 | Schulz et al. | |
| 2010/0237216 A1 | 9/2010 | Napau et al. | |
| 2010/0320352 A1 | 12/2010 | Weber | |
| 2011/0079699 A1 | 4/2011 | Tarusawa et al. | |
| 2011/0308340 A1 | 12/2011 | Bosecker et al. | |
| 2012/0325033 A1 | 12/2012 | Bosecker et al. | |
| 2013/0180348 A1 | 7/2013 | Andres et al. | |
| 2013/0333496 A1 | 12/2013 | Boutouil et al. | |
| 2014/0238188 A1 | 8/2014 | Ito | |
| 2015/0020955 A1 | 1/2015 | Hoffmann et al. | |
| 2015/0059505 A1 | 3/2015 | Enokijima | |

(56) References Cited

U.S. PATENT DOCUMENTS

| | | |
|---|---|---|
| 2015/0210187 A1 | 7/2015 | Harleb et al. |
| 2015/0283924 A1 | 10/2015 | Boutouil et al. |
| 2015/0360587 A1 | 12/2015 | Hoffmann et al. |
| 2016/0257223 A1 | 9/2016 | Markel et al. |
| 2016/0325643 A1 | 11/2016 | Klein-Hitpass et al. |
| 2016/0341214 A1 | 11/2016 | O'Toole et al. |
| 2017/0059017 A1 | 3/2017 | Napau et al. |
| 2017/0203677 A1 | 7/2017 | Becker et al. |
| 2017/0253145 A1 | 9/2017 | Runde et al. |
| 2017/0307053 A1 | 10/2017 | Riester et al. |
| 2018/0065507 A1 | 3/2018 | Napau et al. |
| 2018/0201158 A1 | 7/2018 | Hoffmann |
| 2018/0334054 A1 | 11/2018 | Higuchi et al. |
| 2019/0152347 A1 | 5/2019 | Becker et al. |
| 2019/0168636 A1 | 6/2019 | Higuchi |
| 2019/0202322 A1 | 7/2019 | Napau et al. |
| 2019/0381915 A1* | 12/2019 | Taniguchi ............ B60N 2/0705 |
| 2020/0215936 A1 | 7/2020 | Teer et al. |
| 2020/0223329 A1 | 7/2020 | Dry et al. |
| 2020/0262317 A1 | 8/2020 | Napau et al. |
| 2021/0016375 A1 | 1/2021 | Napau et al. |
| 2021/0252997 A1 | 8/2021 | Gropp et al. |
| 2024/0034201 A1* | 2/2024 | Fisher, III .......... B60N 2/02246 |

FOREIGN PATENT DOCUMENTS

| | | |
|---|---|---|
| CN | 1251411 A | 4/2000 |
| CN | 1309750 A | 8/2001 |
| CN | 101178116 A | 5/2008 |
| CN | 101448674 A | 6/2009 |
| CN | 201350516 Y | 11/2009 |
| CN | 101970900 A | 2/2011 |
| CN | 102510817 A | 6/2012 |
| CN | 101528502 B | 8/2012 |
| CN | 103095041 A | 5/2013 |
| CN | 103101455 A | 5/2013 |
| CN | 203146709 U | 8/2013 |
| CN | 103498891 A | 1/2014 |
| CN | 204226562 U | 3/2015 |
| CN | 104520140 A | 4/2015 |
| CN | 104802666 A | 7/2015 |
| CN | 204774719 U | 11/2015 |
| CN | 204774722 U | 11/2015 |
| CN | 105270212 A | 1/2016 |
| CN | 105599643 A | 5/2016 |
| CN | 107804196 A | 3/2018 |
| CN | 207078030 U | 3/2018 |
| CN | 108426103 A | 8/2018 |
| CN | 208306408 U | 1/2019 |
| CN | 208324966 U | 1/2019 |
| CN | 109538741 A | 3/2019 |
| CN | 110475691 A | 11/2019 |
| DE | 1755740 A1 | 1/1972 |
| DE | 3107455 A1 | 10/1982 |
| DE | 19815283 A1 | 10/1999 |
| DE | 19861100 A1 | 2/2000 |
| DE | 19911432 A1 | 9/2000 |
| DE | 10139631 A1 | 3/2003 |
| DE | 10250994 A1 | 8/2003 |
| DE | 10247204 A1 | 4/2004 |
| DE | 10203983 B4 | 5/2004 |
| DE | 10327103 A1 | 12/2004 |
| DE | 102004013543 A1 | 10/2005 |
| DE | 102005044467 B3 | 3/2007 |
| DE | 202008016335 U1 | 3/2009 |
| DE | 102009006815 A1 | 8/2009 |
| DE | 102013009846 A1 | 12/2013 |
| DE | 10362326 B4 | 2/2014 |
| DE | 102015205440 A1 | 9/2016 |
| DE | 102017100934 A1 | 7/2017 |
| DE | 102017008036 A1 | 3/2018 |
| DE | 102019125196 A1 | 2/2021 |
| EP | 0450324 A2 | 10/1991 |
| EP | 0617213 A1 | 9/1994 |
| EP | 0848672 B1 | 12/1999 |
| EP | 0992711 A2 | 4/2000 |
| EP | 1068093 A1 | 1/2001 |
| EP | 1167113 A1 | 1/2002 |
| EP | 1026027 B1 | 3/2004 |
| EP | 1442923 A2 | 8/2004 |
| EP | 1601550 B1 | 10/2012 |
| FR | 679410 A | 4/1930 |
| FR | 2517018 A3 | 5/1983 |
| FR | 2872747 A1 | 1/2006 |
| FR | 2882975 A1 | 9/2006 |
| GB | 2389066 A | 12/2003 |
| GB | 2404704 A | 2/2005 |
| JP | S62184939 A | 8/1987 |
| JP | H08197988 A | 8/1996 |
| JP | 2010112553 A | 5/2010 |
| JP | 2015134513 A | 7/2015 |
| JP | 2018203208 A | 12/2018 |
| KR | 20090071616 A | 7/2009 |
| KR | 101470180 B1 | 12/2014 |
| KR | 101501384 B1 | 3/2015 |
| KR | 101518647 B1 | 5/2015 |
| KR | 101708126 B1 | 2/2017 |
| WO | 8606036 A1 | 10/1986 |
| WO | 9709192 A1 | 3/1997 |
| WO | 03074209 A2 | 9/2003 |
| WO | 2009092946 A2 | 7/2009 |
| WO | 2010116125 A1 | 10/2010 |
| WO | 2011098161 A1 | 8/2011 |
| WO | 2011137989 A1 | 11/2011 |
| WO | 2012150050 A1 | 11/2012 |
| WO | 2013010888 A2 | 1/2013 |
| WO | 2015161714 A1 | 10/2015 |
| WO | 2018221977 A1 | 12/2018 |

OTHER PUBLICATIONS

German Office Action regarding Patent Application No. 102021204240. 6, dated May 16, 2024.

Dicker Jr. et al., "Worms and Worm Gears." Theory of Machines and Mechanisms, 3rd ed., Oxford University Press, 2003, pp. 306-310.

International Search Report regarding International Application No. PCT/US2016/048649, dated Nov. 28, 2016.

Written Opinion of the International Searching Authority regarding International Application No. PCT/US2016/048649, dated Nov. 28, 2016.

International Search Report regarding International Application No. PCT/US2016/048634, dated Dec. 21, 2016.

Written Opinion of the International Searching Authority regarding International Application No. PCT/US2016/048634, dated Dec. 21, 2016.

Office Action regarding German Patent Application No. 102017008036. 4, dated Apr. 5, 2018.

Office Action regarding Korean Patent Application No. 10-2017-0114314, dated Sep. 28, 2018.

Office Action regarding Korean Patent Application No. 10-2017-0114314, dated Mar. 27, 2019.

International Search Report regarding International Application No. PCT/US2019/021870, dated Jun. 25, 2019.

Written Opinion of the International Searching Authority regarding International Application No. PCT/US2019/021870, dated Jun. 25, 2019.

Office Action regarding Chinese Patent Application No. 201710791607. X, dated Aug. 5, 2019.

Office Action regarding Korean Patent Application No. 10-2017-0114314, dated Sep. 9, 2019.

Office Action regarding Chinese Patent Application No. 201710791607. X, dated Apr. 21, 2020.

International Search Report regarding International Application No. PCT/US2020/012857, dated Apr. 29, 2020.

Written Opinion of the International Searching Authority regarding International Application No. PCT/US2020/012857, dated Apr. 29, 2020.

Office Action regarding German Patent Application No. 102017008036. 4, dated Jul. 17, 2020.

(56) References Cited

OTHER PUBLICATIONS

Office Action regarding German Patent Application No. 102020200205.3, dated Aug. 20, 2020. Partial translation provided by Bardehle Pagenberg Partnerschaft mbB.
Office Action regarding German Patent Application No. 112019000026.8, dated Sep. 25, 2020. Partial translation provided by Bardehle Pagenberg Partnerschaft mbB.
Office Action regarding Chinese Patent Application No. 201710791607.X, dated Dec. 22, 2020.
Office Action regarding German Patent Application No. 102017100934.5, dated Jan. 27, 2021. Translation provided by Witte, Weller & Partner Patentanwälte mbB.
Office Action regarding Korean Patent Application No. 10-2019-7026939, dated Feb. 19, 2021. Translation provided by Koryo IP & Law.
Office Action for U.S. Appl. No. 17/062,931, dated Sep. 9, 2021.
Office Action regarding Chinese Patent Application No. 202010075280.8 dated Nov. 26, 2021.
Office Action regarding Chinese Patent Application No. 202010104705.3 dated Feb. 7, 2022.
Notice of Allowance regarding U.S. Appl. No. 17/236,639 dated Apr. 18, 2022.
Office Action regarding German Patent Application No. 1020170080364, dated May 24, 2022.
Office Action for U.S. Appl. No. 16/737,991, dated May 27, 2022.
Office Action regarding Chinese Patent Application No. 202101047053, dated Jul. 14, 2022.
Notice of Allowance regarding U.S. Appl. No. 17/236,639 dated Aug. 23, 2022.
Notice of Allowance regarding U.S. Appl. No. 17/553,445 dated Sep. 8, 2022.
Office Action regarding German Patent Application No. 1020170080364, dated May 17, 2022.
Office Action regarding German Patent Application No. 1020202002053, dated Sep. 8, 2022.
Non-Final Office Action regarding U.S. Appl. No. 16/787,420 dated Oct. 6, 2022.
Office Action regarding Chinese Patent Application No. 2020101047053, dated Oct. 27, 2022.
Office Action regarding Chinese Patent Application No. 2020800083671, dated Dec. 5, 2022.
Office Action regarding Chinese Patent Application No. 2021104836972, dated Jan. 20, 2023.
Non-Final Office Action regarding U.S. Appl. No. 17/493,287 dated Apr. 18, 2023.
Final Office Action regarding U.S. Appl. No. 16/787,420 dated Apr. 25, 2023.
Notice of Allowance regarding U.S. Appl. No. 16/787,420 dated Jul. 18, 2023.
Notice of Allowance regarding U.S. Appl. No. 17/493,287 dated Jul. 31, 2023.
Non-Final Office Action regarding U.S. Appl. No. 18/378,770 dated Dec. 4, 2024.
International Search Report and Written Opinion of the ISA, issued in PCT/US2023/034992, mailed Jan. 24, 2024; ISA/US (10 pages).

* cited by examiner

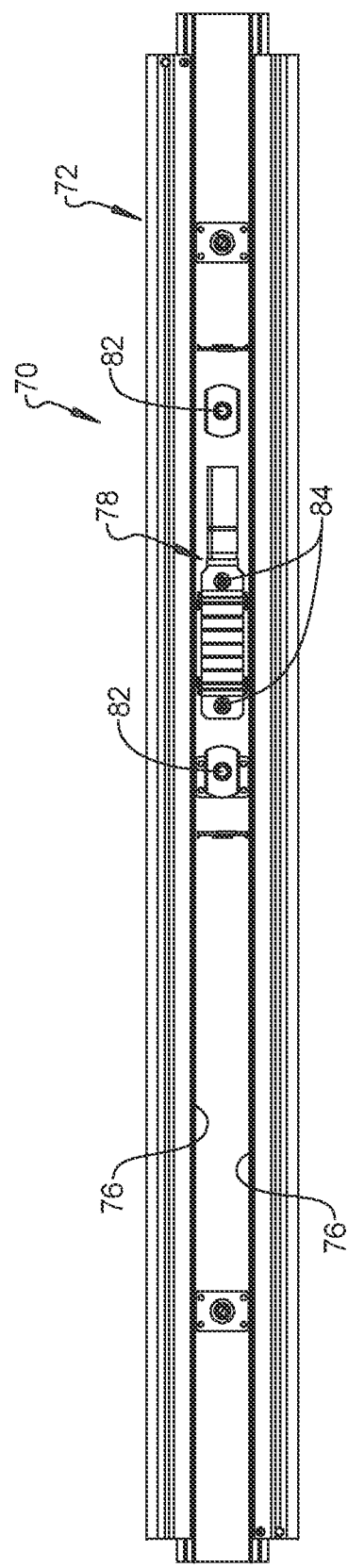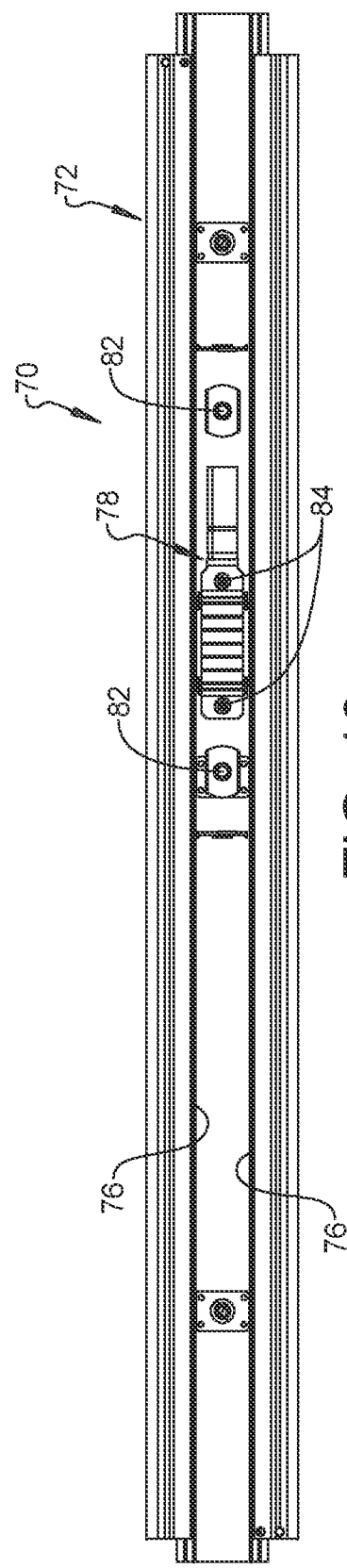
FIG. 18

VEHICLE SEAT ADJUSTMENT SYSTEM WITH POWER LONG RAILS

CROSS-REFERENCE TO RELATED APPLICATIONS

This application claims the benefit of U.S. Provisional Application No. 63/444,667, filed on Feb. 10, 2023 and U.S. Provisional Application No. 63/415,470, filed on Oct. 12, 2022. The entire disclosures of each of the above applications are incorporated herein by reference.

FIELD

The present disclosure relates to a vehicle seat adjustment system with power long rails.

BACKGROUND

This section provides background information related to the present disclosure which is not necessarily prior art.

This disclosure is related to a vehicle seat adjustment system (i.e., for adjusting the fore-aft position of a vehicle seat within a vehicle).

SUMMARY

This section provides a general summary of the disclosure and is not a comprehensive disclosure of its full scope or all of its features.

According to an aspect of the present disclosure, a power rail system for a vehicle seat includes an outer track defining an elongated channel with an elongated lead screw mounted in the channel. An inner track is received in the elongated channel and a power length adjuster gear transmission is mounted to the inner track and drivingly engaged with the elongated lead screw.

According to another aspect, the inner track is supported within the channel by a roller bearing system.

According to another aspect, the roller bearing system includes front and rear roller cage pairs disposed at a front and a rear end of the inner track, respectively.

According to another aspect, the inner track includes a pair of side flanges and the front and rear roller cage pairs are supported by the side flange of the inner track.

According to another aspect, the front and rear roller cage pairs are clipped to the side flange of the inner track.

According to another aspect, the outer track includes a base and a pair of sidewalls, the pair of sidewalls each include a hook-shaped upper flange in cross-section.

According to another aspect, the inner track includes a pair of side flanges that are received in the hook-shaped upper flanges of the pair of sidewalls.

According to another aspect, the base of the outer track includes a pair of stepped side surfaces.

According to another aspect, the inner track is supported on the pair of stepped side surfaces by a roller bearing system.

According to another aspect, a pair of elongated carpet cover rails are connected on opposite sides of the outer track.

According to another aspect, the pair of elongated carpet cover rails are secured to the track by a plurality of carpet cover brackets.

According to another aspect, the inner track includes an upper wall and a pair of sidewalls and the power length adjuster gear transmission is mounted between the pair of sidewalls of the inner track.

According to another aspect, the power length adjuster gear transmission includes an input worm gear connected to a drive motor and an output worm nut disposed on the elongated lead screw and drivingly engaged with the input worm gear.

According to another aspect, the drive motor is a planetary gear motor.

According to another aspect, the power length adjuster gear transmission includes an input helical gear connected to a drive motor and an output helical gear nut disposed on the elongated lead screw and drivingly engaged with the input helical gear.

According to another aspect, the power length adjuster gear transmission includes a herringbone input worm gear connected to a drive motor and an output herringbone worm nut disposed on the elongated lead screw and drivingly engaged with the herringbone input worm gear.

According to another aspect, the elongated lead screw is mounted to a front attachment bracket and a rear attachment bracket each mounted to a base of the track.

According to a further aspect, a vehicle seat includes a pair of power rails each including: an outer track defining an elongated channel and an elongated lead screw mounted in the channel. An inner track is received in the elongated channel and a power length adjuster gear transmission is mounted to the inner track and drivingly engaged with the elongated lead screw. A seat structure is mounted to the inner track of each of the pair of power rails.

According to another aspect, a power rail system for a vehicle seat, includes an outer track defining an elongated channel with a pair of sidewalls each including an integrally formed screw thread rack. An inner track is received in the elongated channel and a power length adjuster gear transmission is mounted to the inner track and drivingly engaged with the screw thread racks on each of the pair of sidewalls.

According to another aspect, the power length adjuster gear transmission includes an input worm gear connected to a drive motor and a pair of twin drive worms drivingly engaged with the input worm gear and a respective one of the screw thread racks of the pair of sidewalls of the outer track.

According to another aspect, the inner track includes a first bent plate layered with a second bent plate, wherein the first bent plate defines a first of the pair of side flanges and the second bent plate defines a second of the pair of side flanges.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 18 is a top plan view of the pair of power long rail assemblies shown in FIG. 16;

Corresponding reference numerals indicate corresponding parts throughout the several views of the drawings.

DETAILED DESCRIPTION

Example embodiments will now be described more fully with reference to the accompanying drawings.

Figure 1:
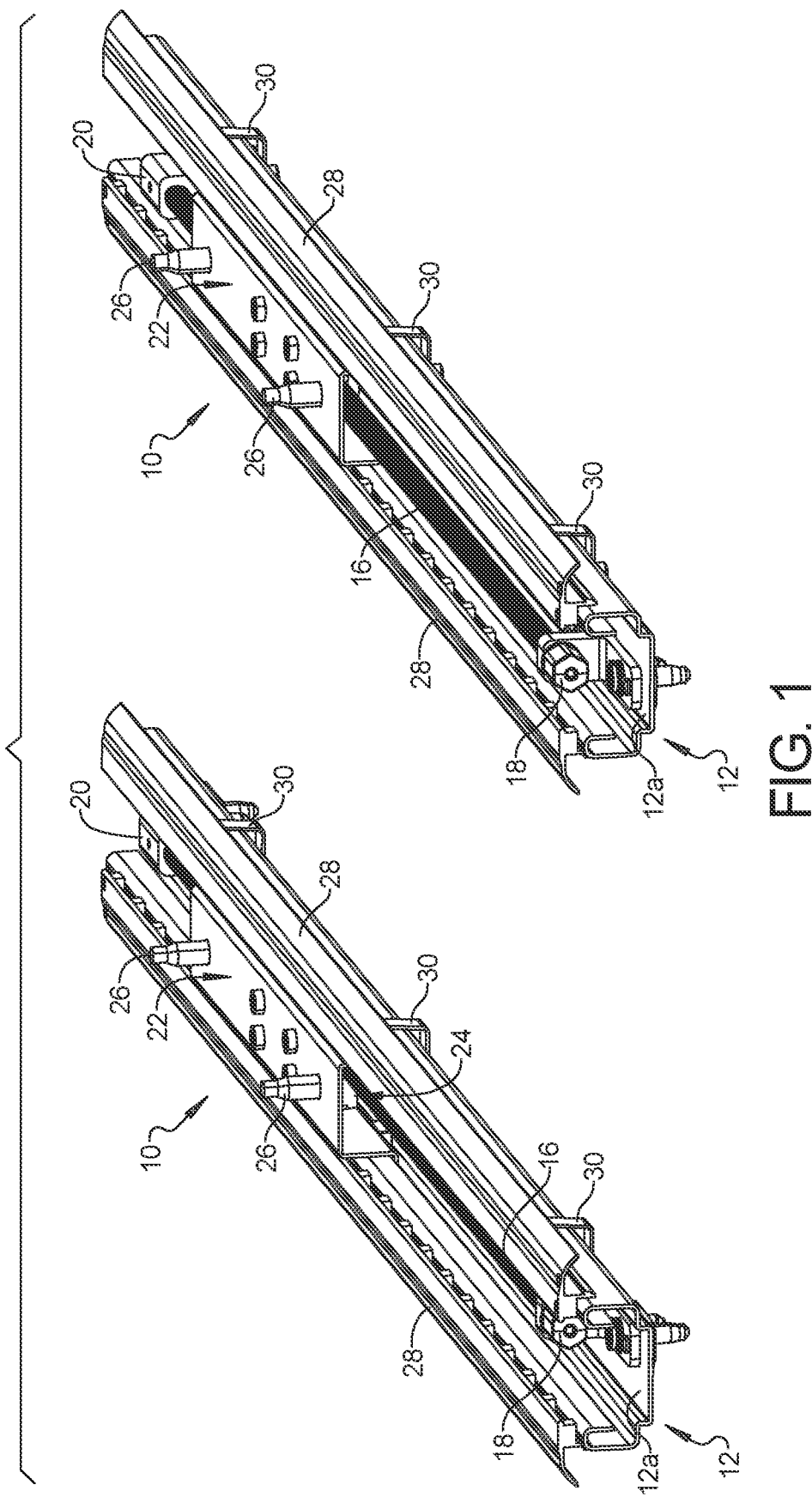
FIG. 1 is a perspective view of a pair of power long rail assemblies for a vehicle seat adjustment system according to the principles of the present disclosure.
Figure 2:
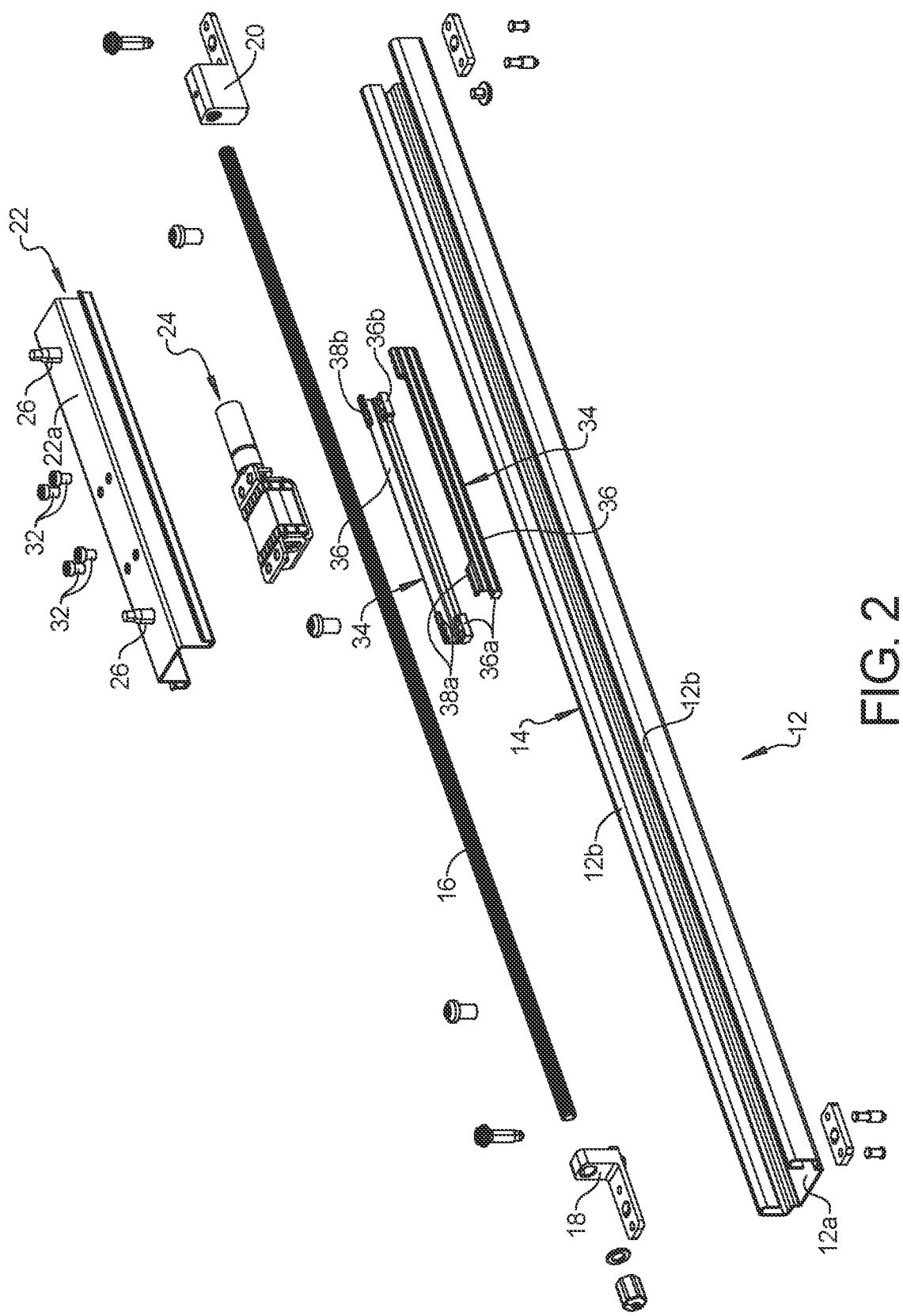
FIG. 2 is an exploded perspective view of a power long rail assembly according to the principles of the present disclosure.
Figure 3:
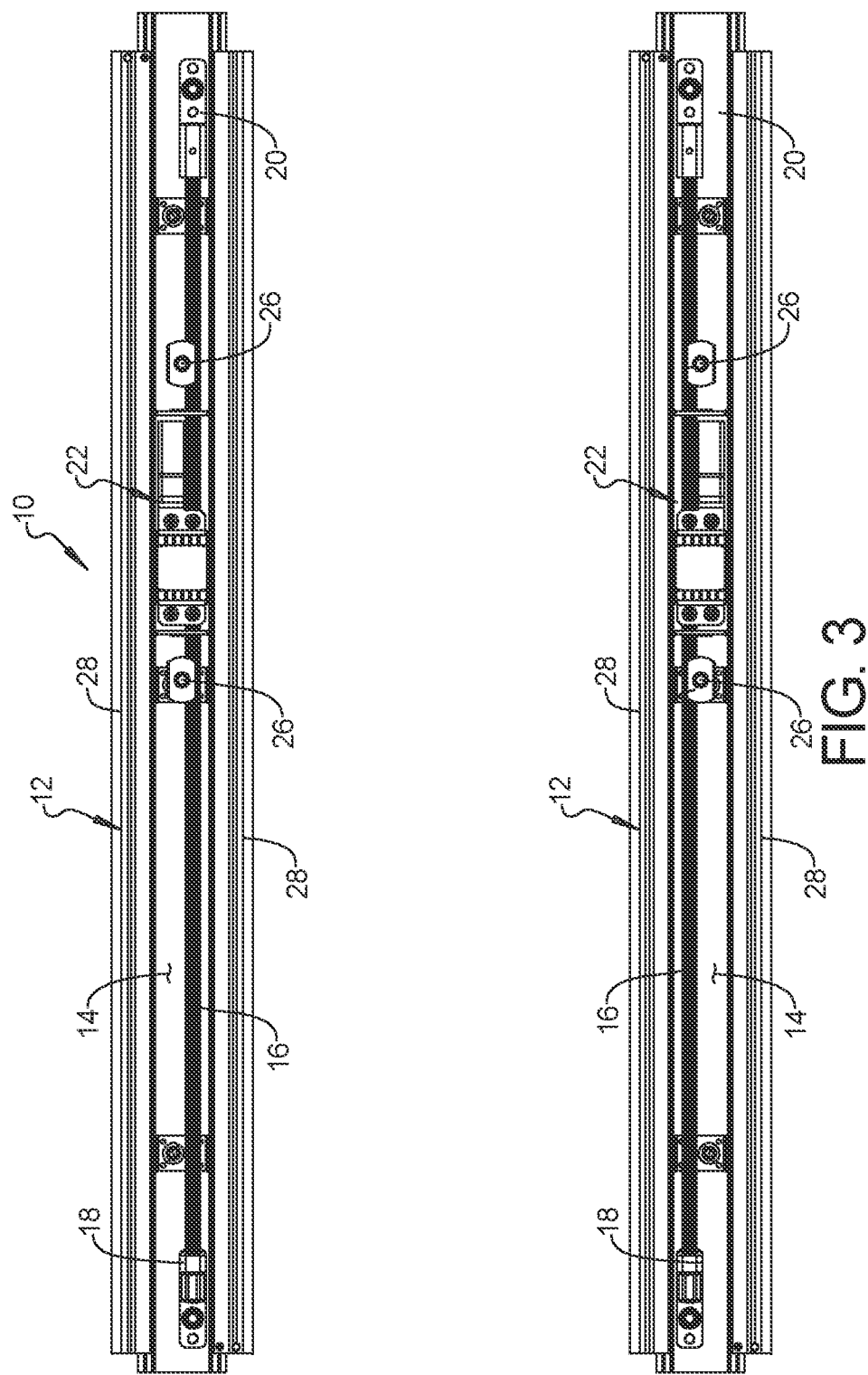
FIG. 3 is a top plan view of the pair of power long rail assemblies according to the principles of the present disclosure.
Figure 4:
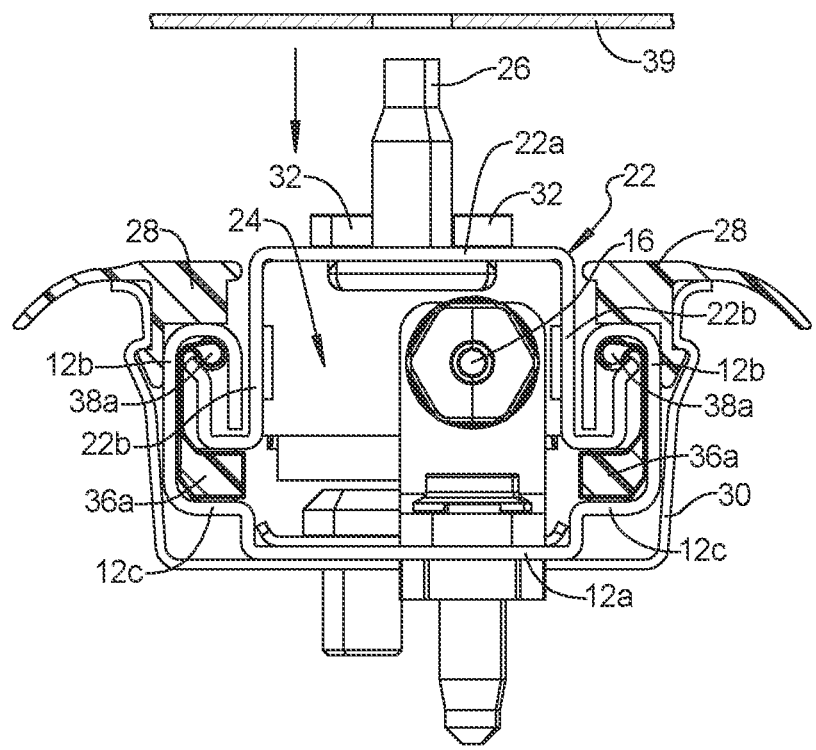
FIG. 4 is an end plan view of the inboard power long rail assembly.
Figure 14:
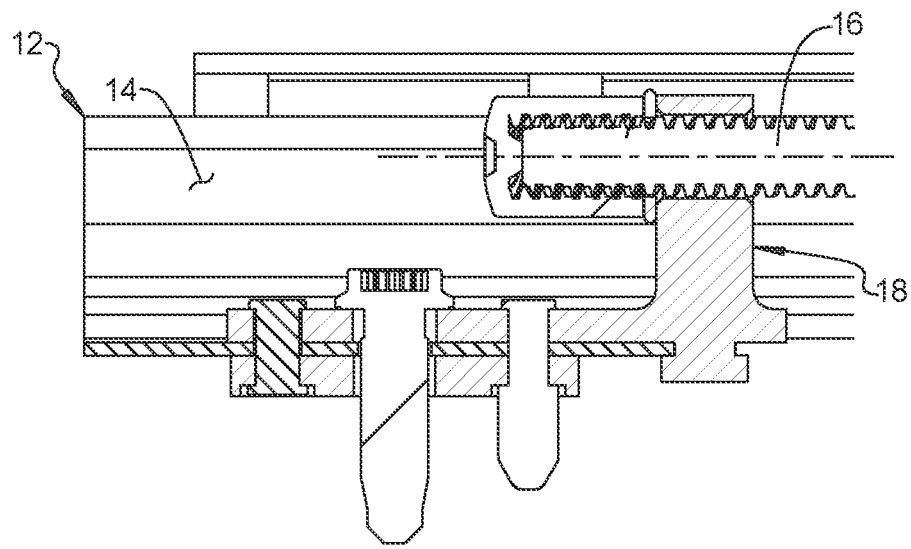
FIG. 14 is a cross-sectional view of a lead screw front attachment system according to the principles of the present disclosure.
Figure 15:
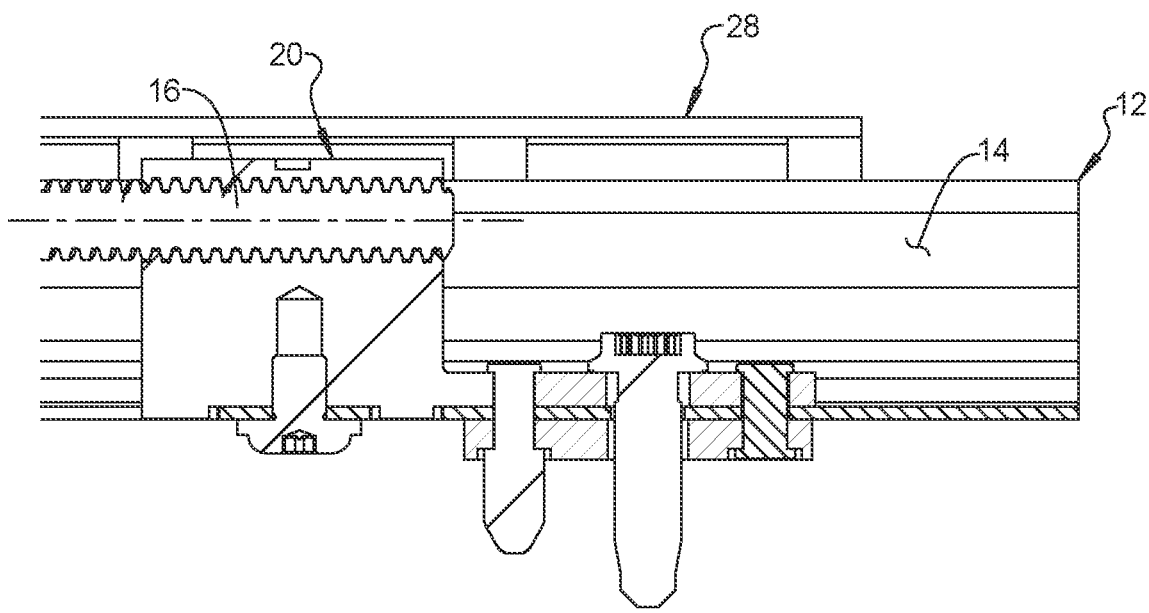
FIG. 15 is a cross-sectional view of a lead screw rear attachment system according to the principles of the present disclosure.

With reference to FIGS. 1-3, a pair of power rails 10 for a seat adjustment system will now be described. The pair of power rails 10 each include an outer track 12 defining an elongated channel 14. An elongated lead screw 16 is mounted in the channel 14 by a front attachment bracket 18 and a rear attachment bracket 20 that are mounted to a base 12a of the outer track 12. A detailed cross-sectional view of the front attachment bracket 18 is shown in FIG. 14 and a detailed cross-sectional view of the rear attachment bracket 20 is shown in FIG. 15. The elongated lead screw 16 can be threadedly engaged with at least one of the brackets 18, 20 (see FIG. 15) to prevent axial movement thereof. An inner track 22 is received in the elongated channel 14 and a power length adjuster gear transmission 24 is mounted to the inner track 22 and is drivingly engaged with the elongated lead screw 16. A pair of chair mounting studs 26 are mounted to the inner track 22. A pair of elongated carpet cover rails 28 are connected on opposite sides of the outer track 12 by a plurality of carpet cover brackets 30, as best shown in FIG. 4. The pair of elongated carpet cover rails 28 can be made from plastic and are disposed at the vehicle floor level to cover the carpet edges disposed along the outer track 12.

With reference to FIG. 2, the power length adjuster gear transmission 24 is mounted to an upper wall 22a of the inner track 22 by attachment screws 32. The inner track 22 is supported within the channel 14 by a pair of cage roller assemblies 34. The pair of cage roller assemblies 34 include an elongated support 36 that can be made from plastic and that supports a front and a rear cage roller assembly 36a, 36b at opposite ends. The cage roller assemblies 36a, 36b each include one or more roller bearings and can also be made from plastic. The pair of cage roller assemblies 34 can each include a front and a rear clip 38a, 38b that support the pair of cage roller assemblies 34 to the side flanges 22b of the inner track 22 (See FIG. 4). Accordingly, the roller bearing system includes front and rear roller cage pairs 36a, 36b disposed at a front and a rear end of the inner track 22, respectively.

With reference to FIG. 4, the inner track 22 includes the upper wall 22a and the side flanges 22b, each of which is hook-shaped in cross-section. The hook-shaped side flanges 22b bend laterally outward and upward from their bottom end. In addition, the sidewalls 12b of the outer track 12 each include a hook-shaped upper flange in cross-section. The hook-shaped upper flange of the sidewalls 12b bend laterally inward and downward. The pair of side flanges 22b of the inner track 22 are received in the hook-shaped upper flanges of the pair of sidewalls 12b. The base 12a of the outer track 12 includes a pair of stepped side surfaces 12c on which the front and rear cage roller assemblies 36a, 36b are supported. As shown in FIG. 4, a chair structure 39 (a base of which is shown) is mounted to the chair mounting stud 26.

Figure 5:
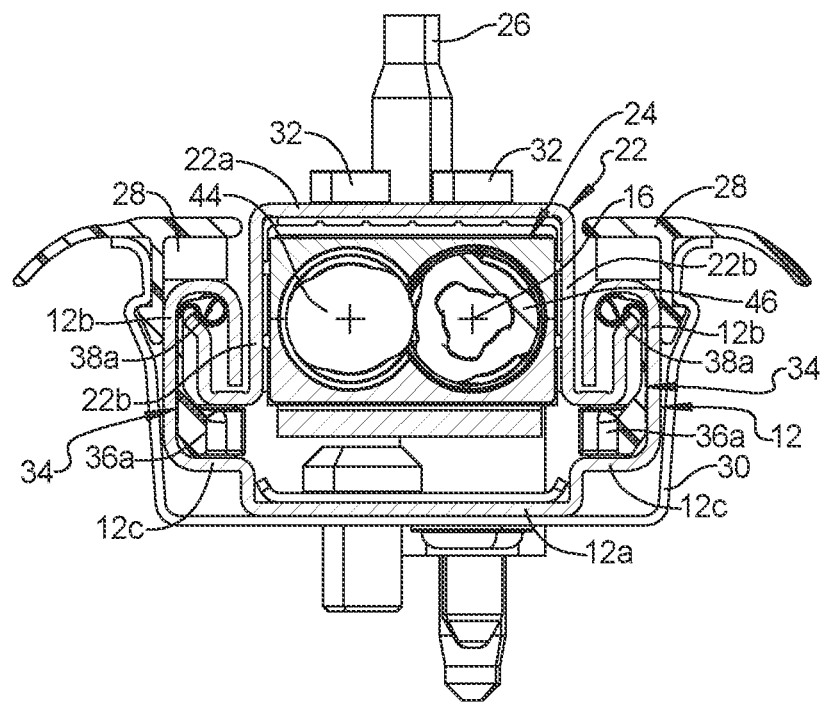
FIG. 5 is a transverse cross-sectional view of the inboard power long rail assembly.
Figure 6:
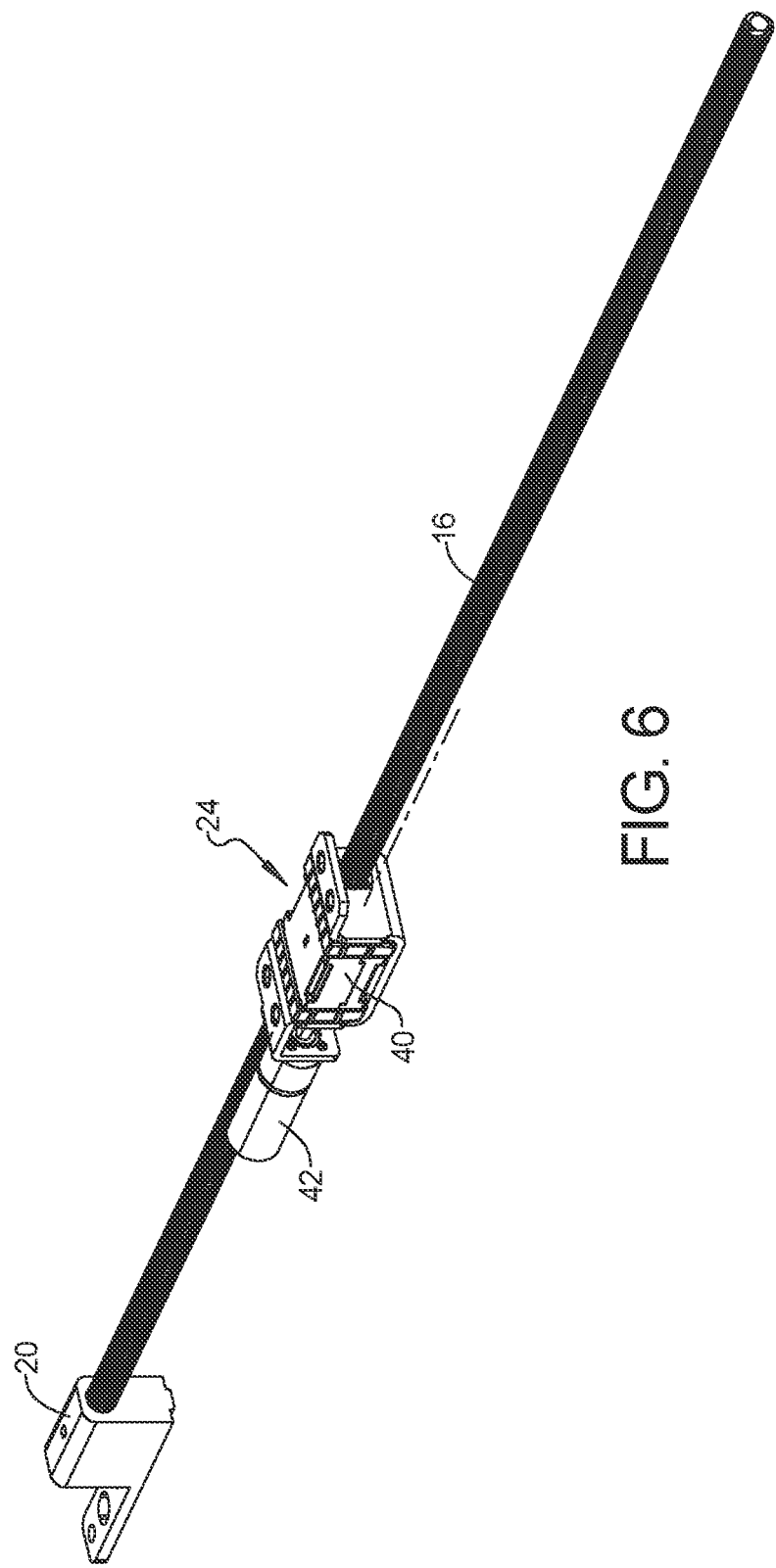
FIG. 6 is a perspective view of a vehicle seat power length adjuster transmission with parallel dual worm gear system according to an example embodiment.
Figure 7:
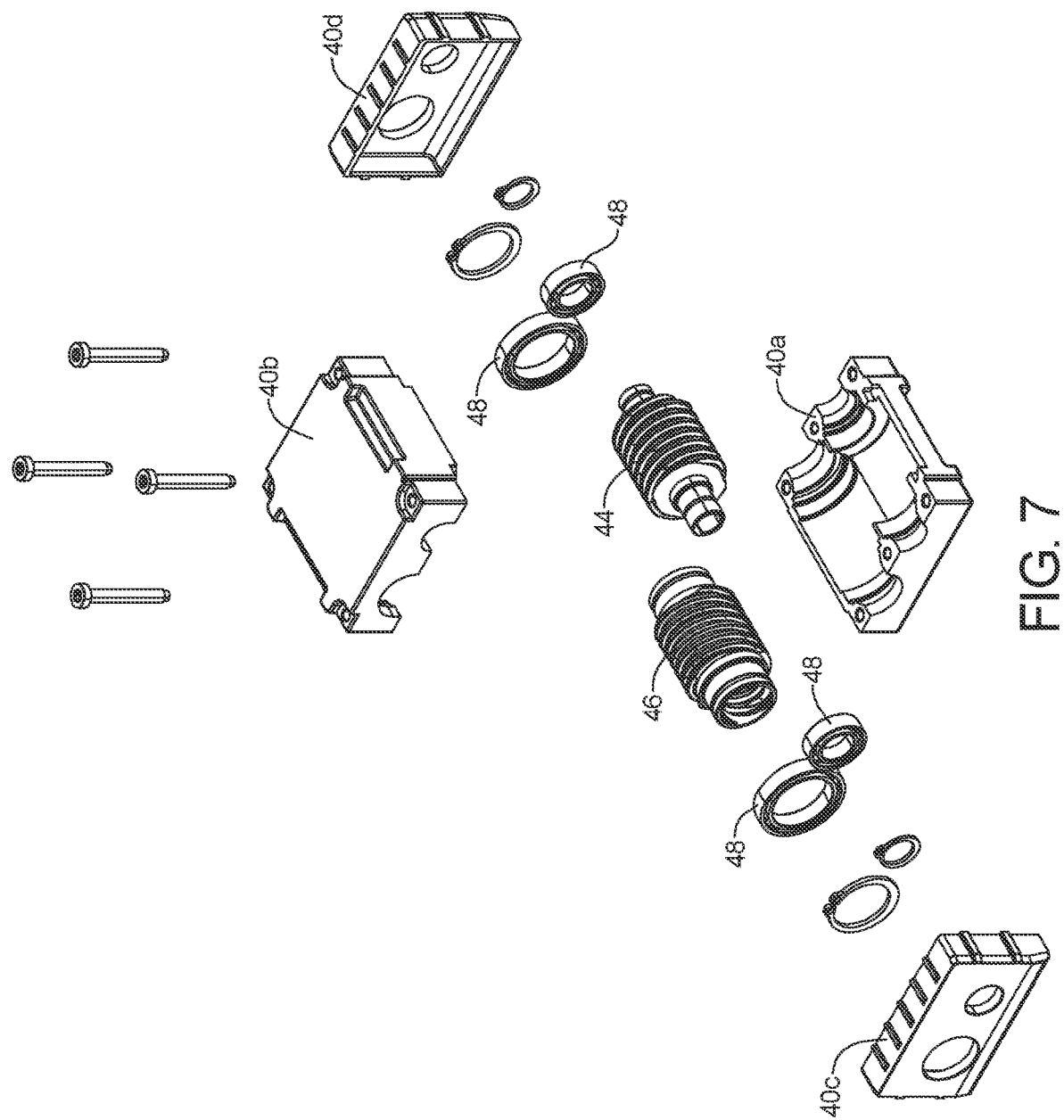
FIG. 7 is an exploded perspective view of a parallel dual worm gear transmission according to the principles of the present disclosure.
Figure 8:
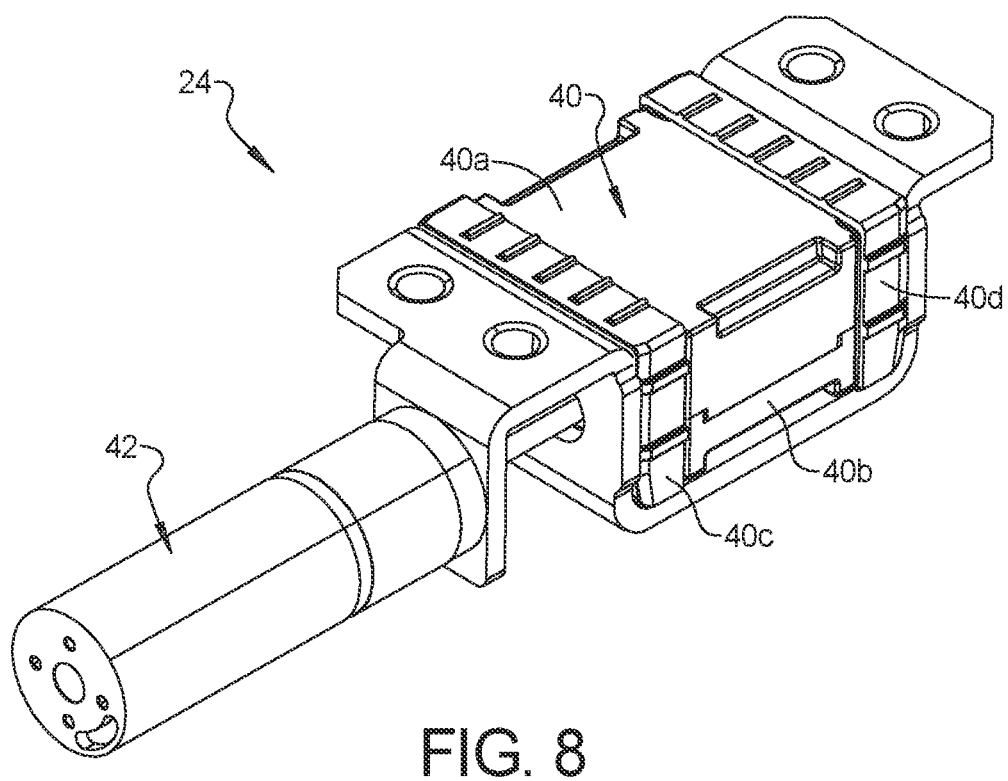
FIG. 8 is a perspective view of a parallel dual worm gear transmission according to the principles of the present disclosure.
Figure 9:
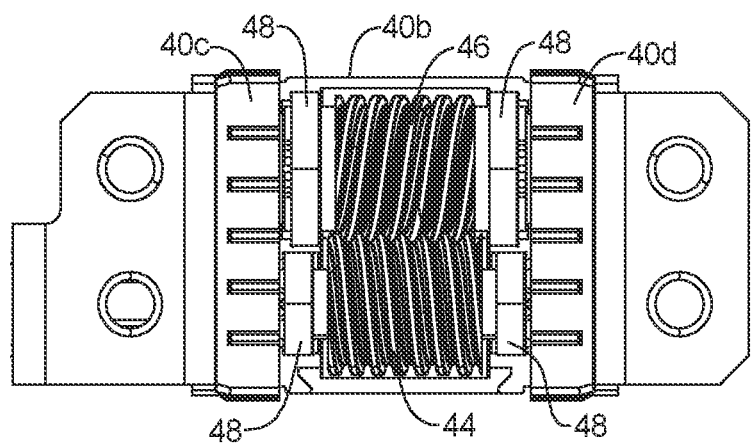
FIG. 9 is a top plan view of a self-locking parallel dual worm gear system according to the principles of the present disclosure.

With reference to FIG. 5, the power length adjuster gear transmission 24 is mounted between the pair of side flanges 22b of the inner track 22. With reference to FIGS. 5 and 6, the elongated lead screw 16 extends through a housing 40 of the power length adjuster gear transmission 24. A planetary gear motor 42 is mounted to the housing 40. With reference to FIGS. 7-9, the power length adjuster gear transmission 24 can include an input worm gear 44 connected to the planetary gear motor 42 and an output worm nut 46 threadedly engaged on an interior with the elongated lead screw 16 and drivingly engaged on an exterior with the input worm gear 44. The parallel dual worm gear system 44, 46 is self-locking to prevent movement of the transmission 24 unless driven by the planetary gear motor 42. The planetary gear motor 42 can include a brushless DC motor that drives an optional planetary gear system that is drivingly connected to the input worm gear 44. The housing 40 rotatably supports the input worm gear 44 and the output worm nut 46 via ball bearing assemblies 48. The housing 40 can include upper and lower covers 40a, 40b and end covers 40c, 40d, as best shown in FIG. 7. The end covers 40c, 40d can be made from plastic.

Figure 10:
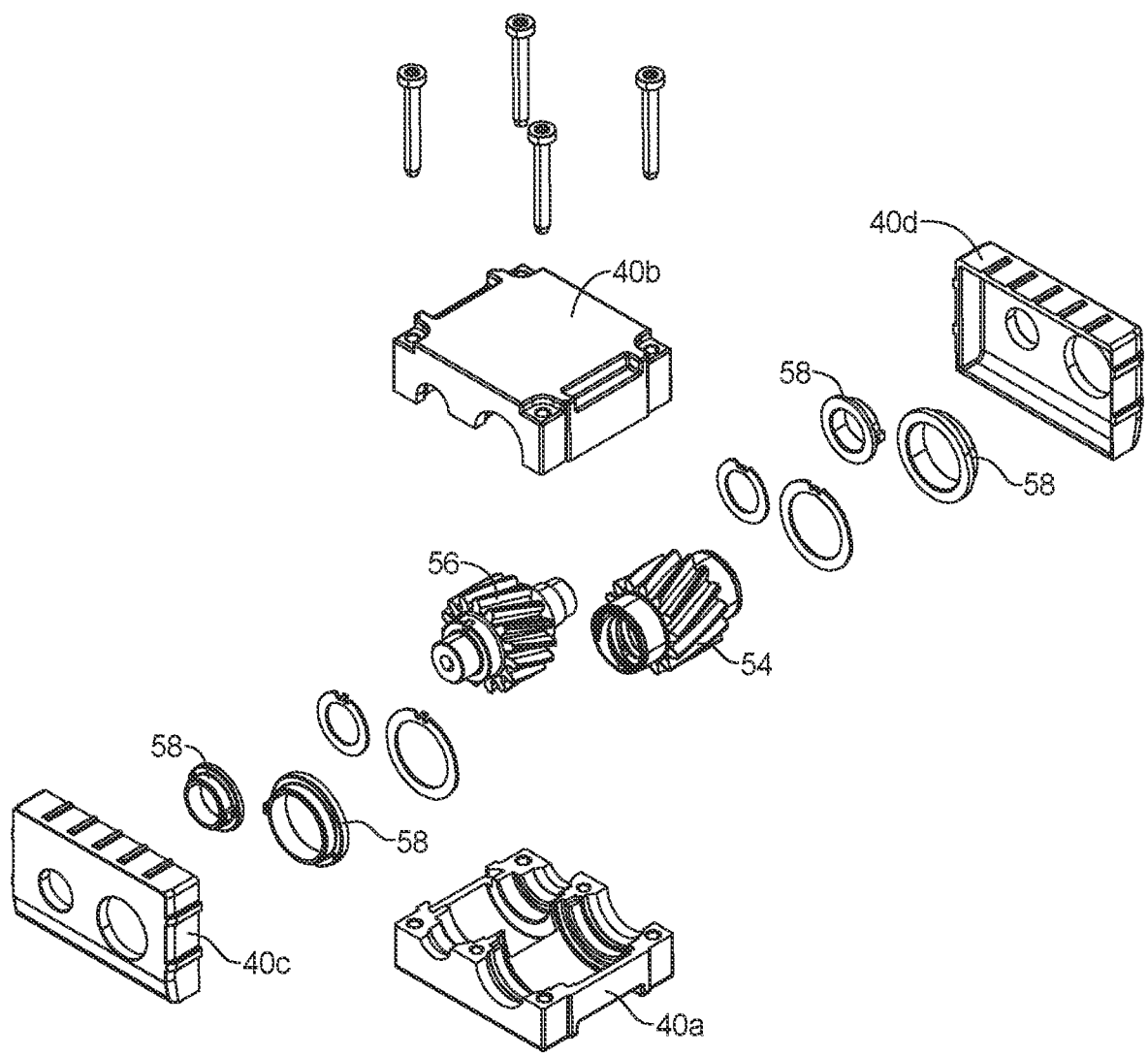
FIG. 10 is an exploded perspective view of a parallel helical gear transmission according to a further example embodiment.
Figure 11:
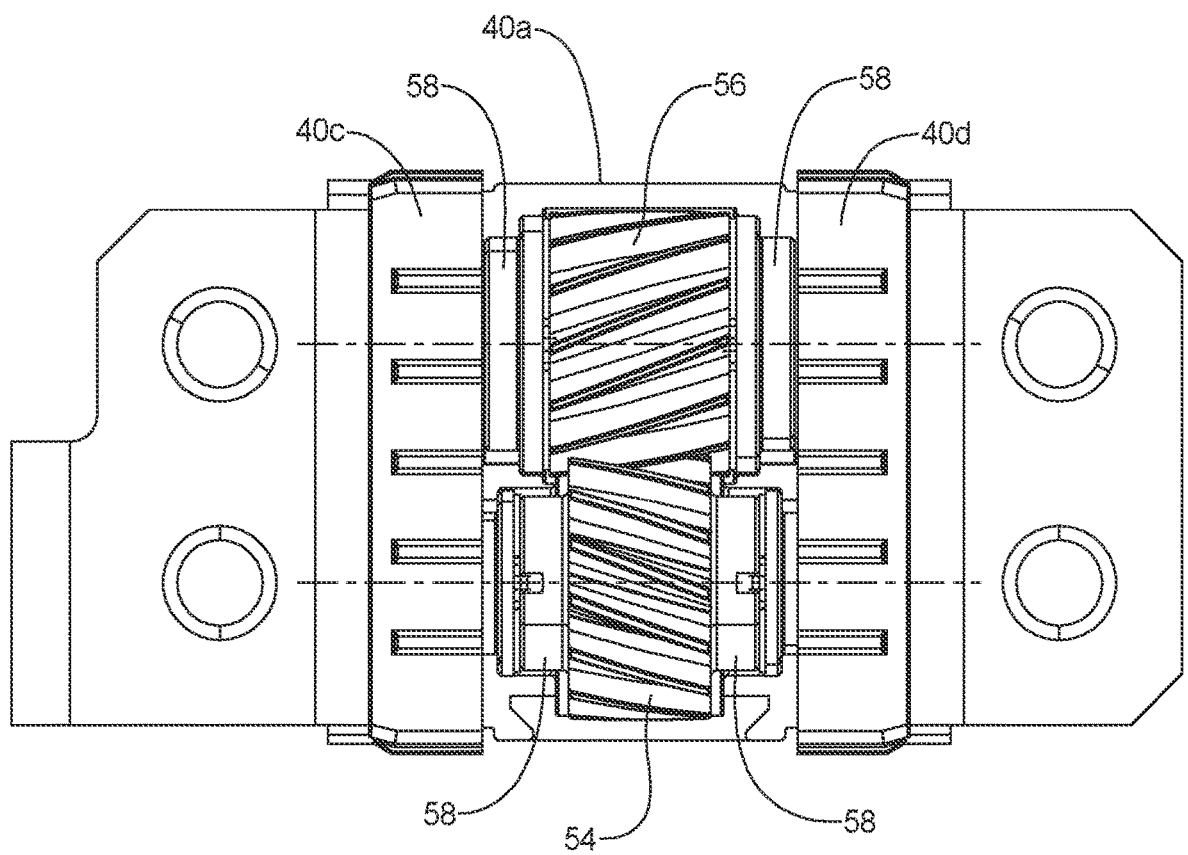
FIG. 11 is a top plan view of a parallel helical gear system according to the principles of the present disclosure.

According to an alternative embodiment as shown in FIGS. 10-11, the power length adjuster gear transmission 24 can include an input helical gear 54 connected to the planetary gear motor 42 and a helical gear nut 56 threadedly engaged on an interior with the elongated lead screw 16 and drivingly engaged on an exterior with the input helical gear 54. The planetary gear motor 42 can include a brushless DC motor that drives an optional planetary gear system that is drivingly connected to the input helical gear 54. The housing 40 rotatably supports the input helical gear 54 and the output helical gear nut 56 via ball bearing bushings 58 that can be made from plastic.

Figure 12:
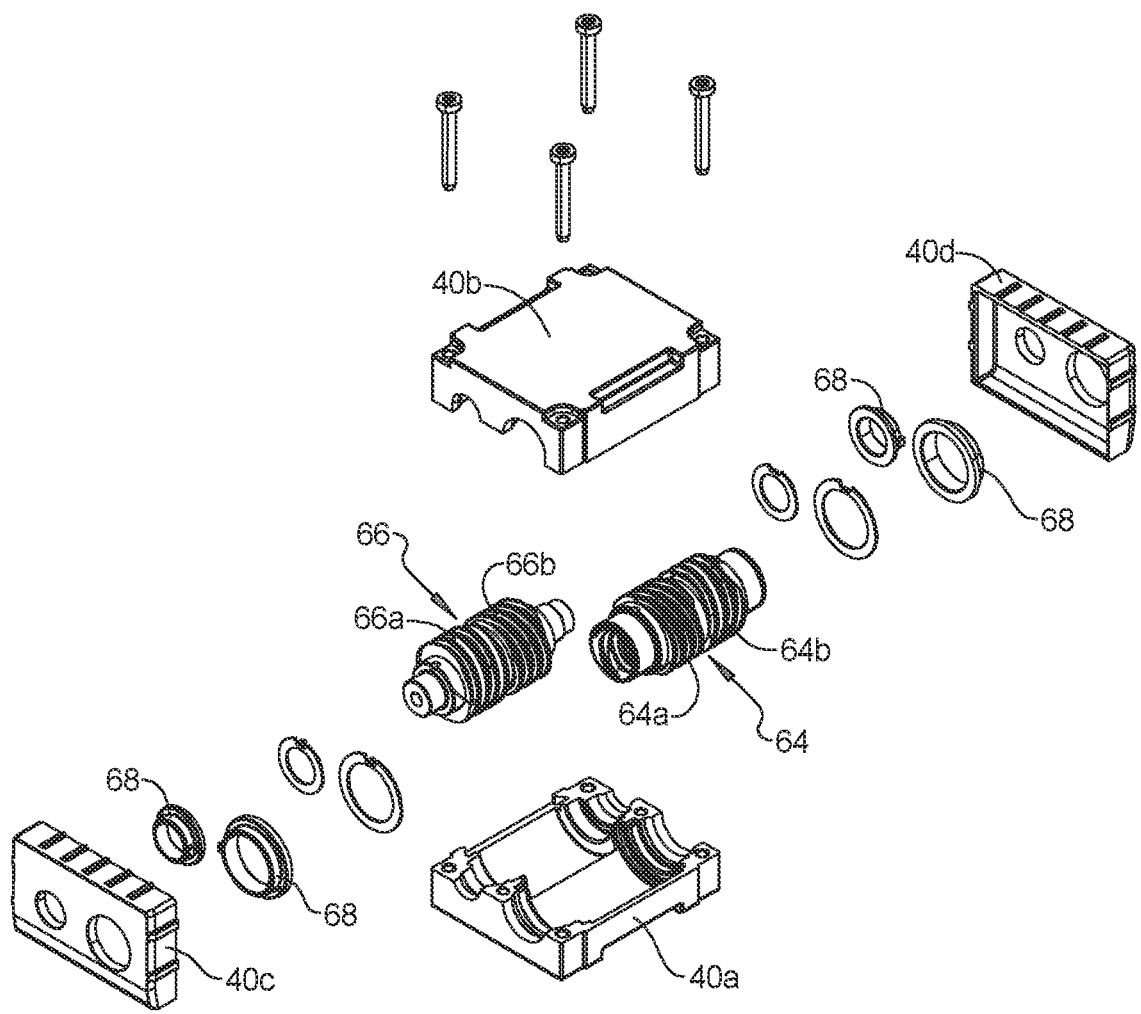
FIG. 12 is an exploded perspective view of a herringbone type dual worm gear transmission according to a further example embodiment.
Figure 13:
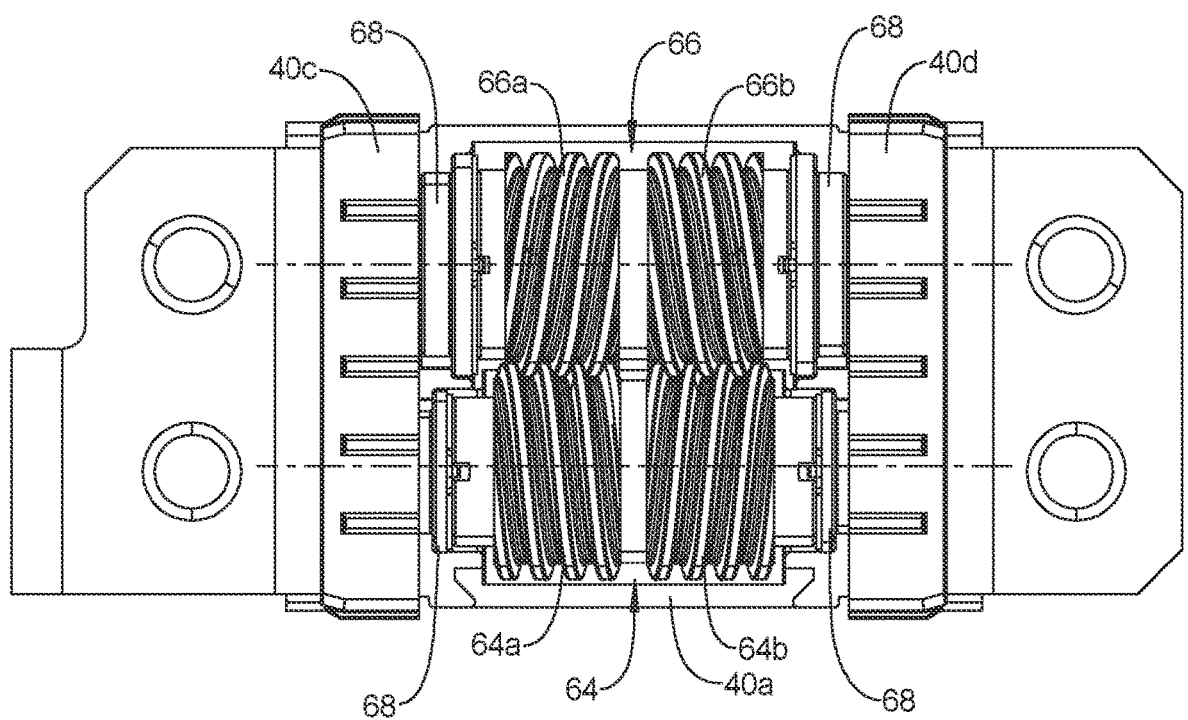
FIG. 13 is a top plan view of a herringbone type dual worm gear system according to the principles of the present disclosure.

According to an alternative embodiment as shown in FIGS. 12-13, the power length adjuster gear transmission 24 can include a herringbone input worm 64 connected to the planetary gear motor 42 and a herringbone output worm nut 66 threadedly engaged on an interior with the elongated lead screw 16 and drivingly engaged on an exterior with the herringbone input worm 64. The herringbone input worm 64 and the herringbone output worm nut 66 each have a first worm thread 64a, 66a and a second opposite direction worm thread 64b, 66b that balance the axial loads of one another to provide an axial load free gear system. The parallel herringbone type dual worm gear system 64, 66 is also self-locking to prevent movement of the transmission 24 unless driven by the planetary gear motor 42. In addition, the planetary gear motor 42 can include a brushless DC motor that drives an optional planetary gear system that is drivingly connected to the input herringbone worm 64. The housing 40 rotatably supports the input herringbone worm 64 and the output herringbone worm nut 66 via ball bearing bushings 68 that can be made from plastic.

Figure 16:
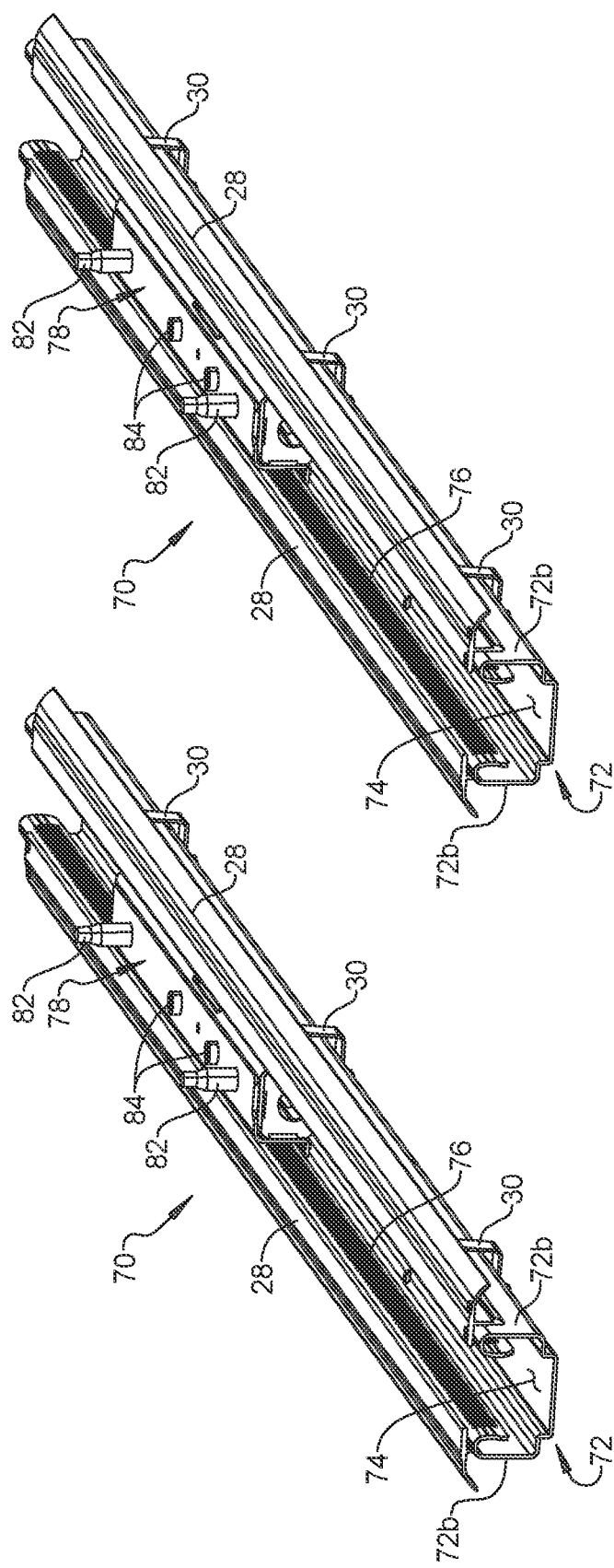
FIG. 16 is a perspective view of a pair of power long rail assemblies for a vehicle seat adjustment system according to a further embodiment of the present disclosure.
Figure 17:
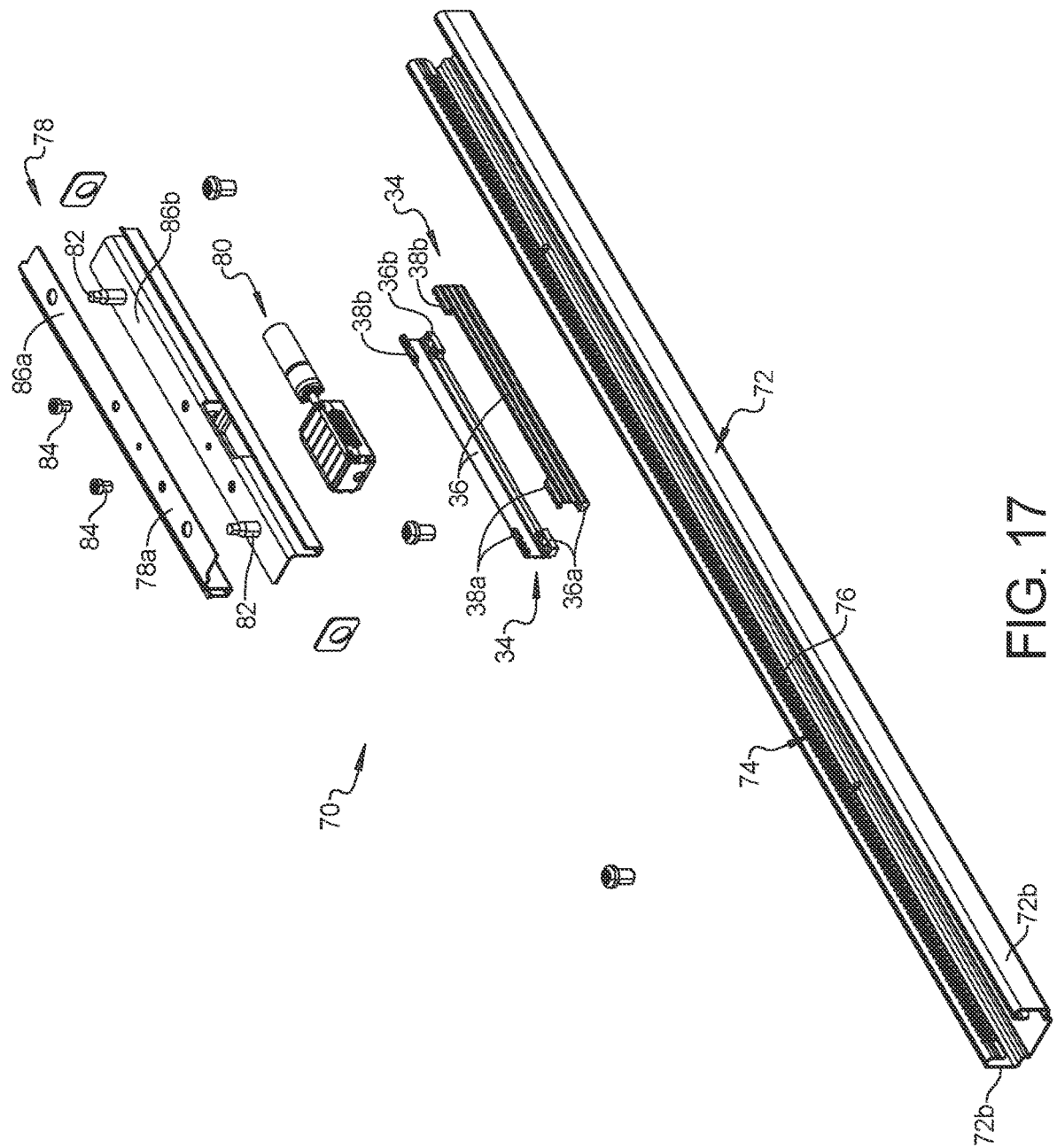
FIG. 17 is an exploded perspective view of the power long rail assembly shown in FIG. 16.

With reference to FIGS. 16-18, a pair of power rails 70 for a seat adjustment system will now be described. The pair of power rails 70 each include an outer track 72 defining an elongated channel 74. A pair of screw thread racks 76 extend along each of the side walls 72b on opposite sides of the channel 74. The screw thread racks 76 are integrally formed within the side walls 72b by spaced diagonal grooves 76a formed into the sidewalls 72b by cutting or stamping. The outer track 72 can be formed from an elongated sheet of steel or other appropriate metal. The two laterally spaced rows of diagonal grooves 76a can be cut or stamped from the sheet and the sheet can be bent from a flat configuration into the cross-section shown in FIGS. 19 and 20.

Figure 19:
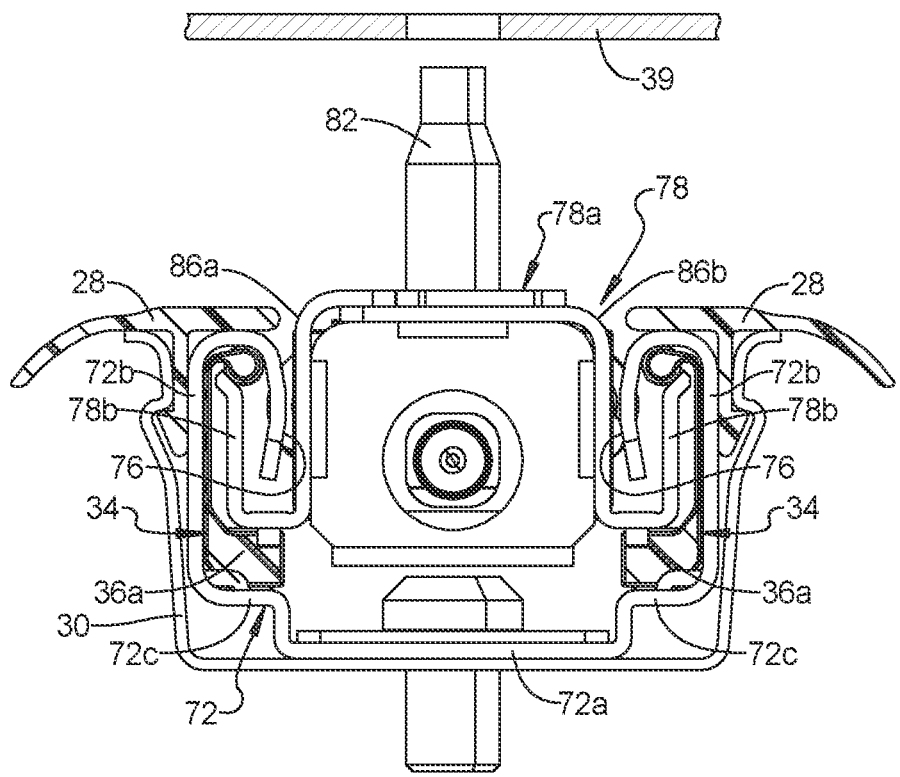
FIG. 19 is an end plan view of the inboard power long rail assembly of FIG. 16.
Figure 20:
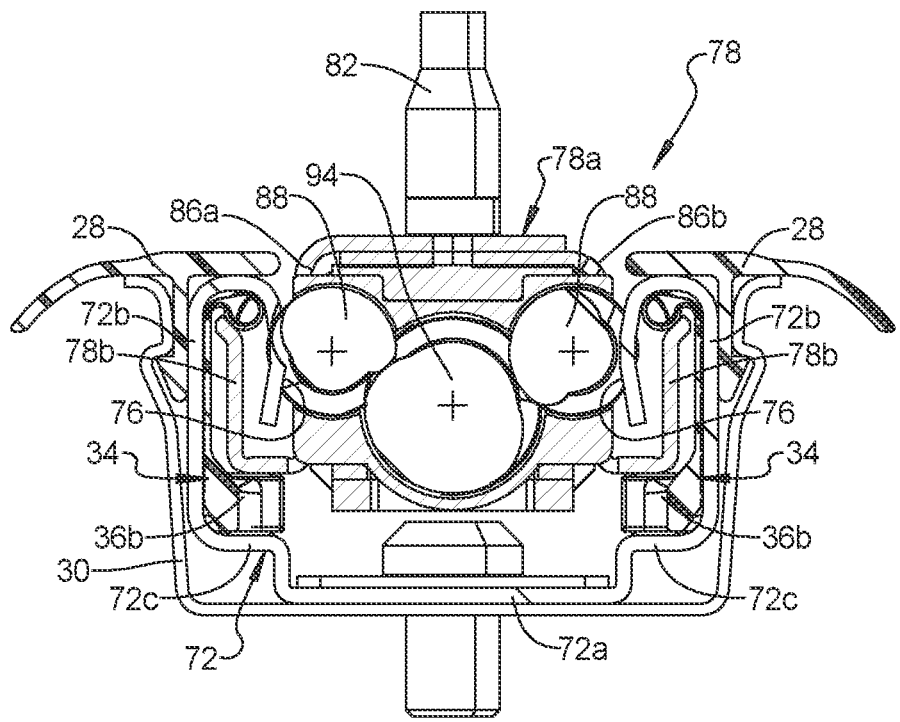
FIG. 20 is a transverse cross-sectional view of the inboard power long rail assembly of FIG. 16.

An inner track 78 is received in the elongated channel 74 of the outer track 72 and a power length adjuster gear transmission 80 is mounted to the inner track 78 and is drivingly engaged with the pair of screw thread racks 76. A pair of chair mounting studs 82 are mounted to the inner track 78. A pair of elongated carpet cover rails 28 are connected on opposite sides of the outer track 72 by a plurality of carpet cover brackets 30, as best shown in FIGS. 19 and 20. In a vehicle assembly, the pair of elongated carpet cover rails 28 are disposed at the vehicle floor level to cover the carpet edges disposed along the outer track 72.

With reference to FIG. 17, the power length adjuster gear transmission 80 is mounted to an upper wall 78a of the inner track 78 by attachment screws 84. The inner track 78 is supported within the channel 74 by a pair of cage roller assemblies 34. The pair of cage roller assemblies 34 include an elongated support 36 that supports a front and a rear cage roller assembly 36a, 36b at opposite ends. The cage roller assemblies 36a, 36b each include one or more roller bearings. The pair of cage roller assemblies 34 can each include a front and a rear clip 38a, 38b that support the pair of cage roller assemblies 34 to the side flanges 78b of the inner track 78 (See FIG. 19). Accordingly, the roller bearing system includes front and rear roller cage pairs 36a, 36b disposed at a front and a rear portion of the inner track 78, respectively.

With reference to FIG. 19, the inner track 78 can be formed by two plates 86a, 86b that are assembled together to include the upper wall 78a and the pair of side flanges 78b, each of which is hook-shaped in cross-section. The hook-shaped side flanges 78b bend outward and upward. In addition, the sidewalls 72b of the outer track 72 each include a hook-shaped upper flange in cross-section. The hook-shaped upper flange of the sidewalls 72b bend inward and downward with the diagonal grooves 76b of the screw thread racks 76 being formed directly in and along the sidewalls 72b. The pair of side flanges 78b of the inner track 78 are received in the hook-shaped upper flanges of the pair of sidewalls 72b. The base 72a of the outer track 72 includes a pair of stepped side surfaces 72c on which the front and rear cage roller assemblies 36a, 36b are supported. As shown in FIG. 19, a chair structure 39 (a base of which is shown) is mounted to the chair mounting stud 82.

Figure 21:
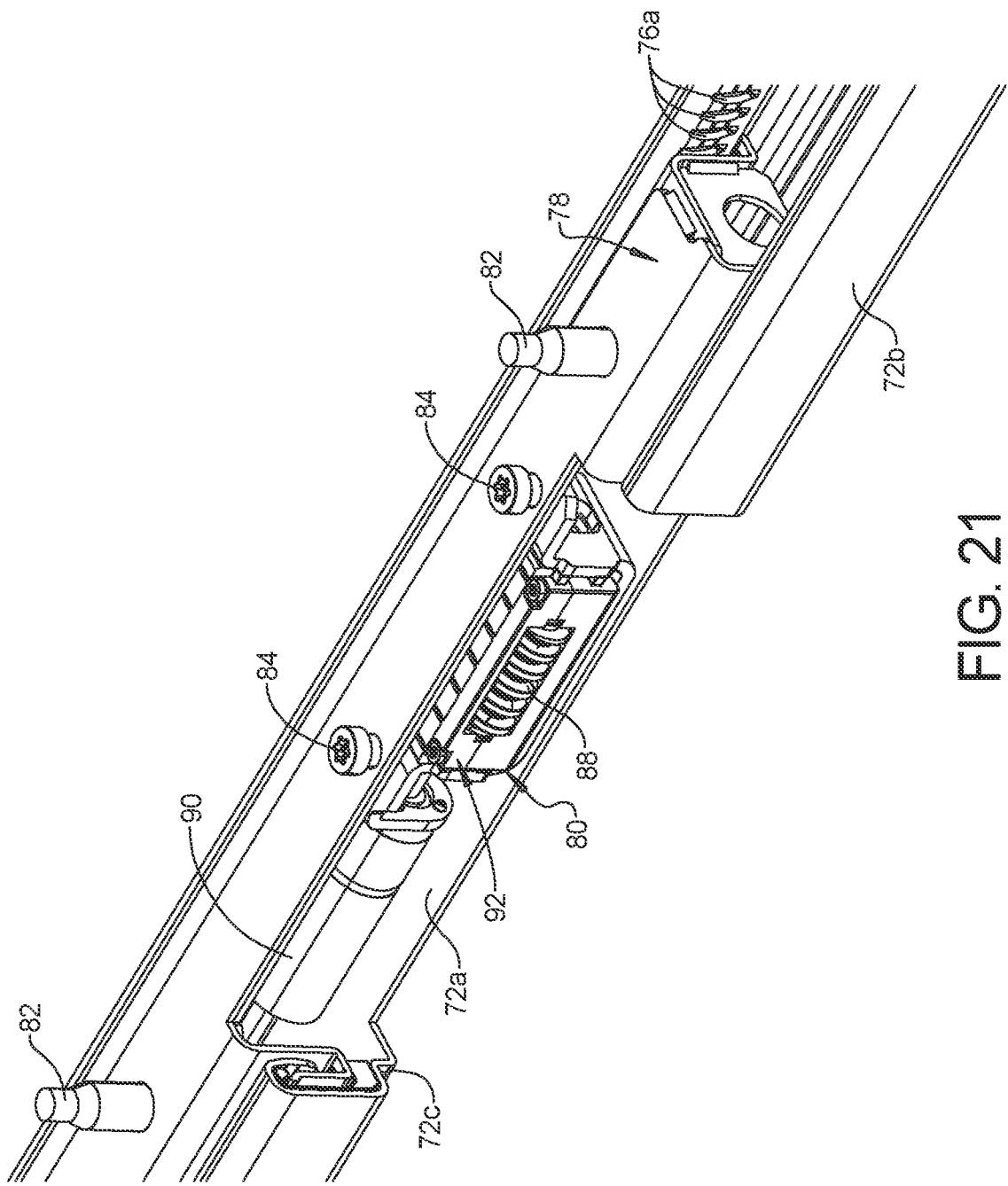
FIG. 21 is a partial cutaway perspective view of the vehicle seat power length adjuster transmission of FIG. 16.
Figure 22:
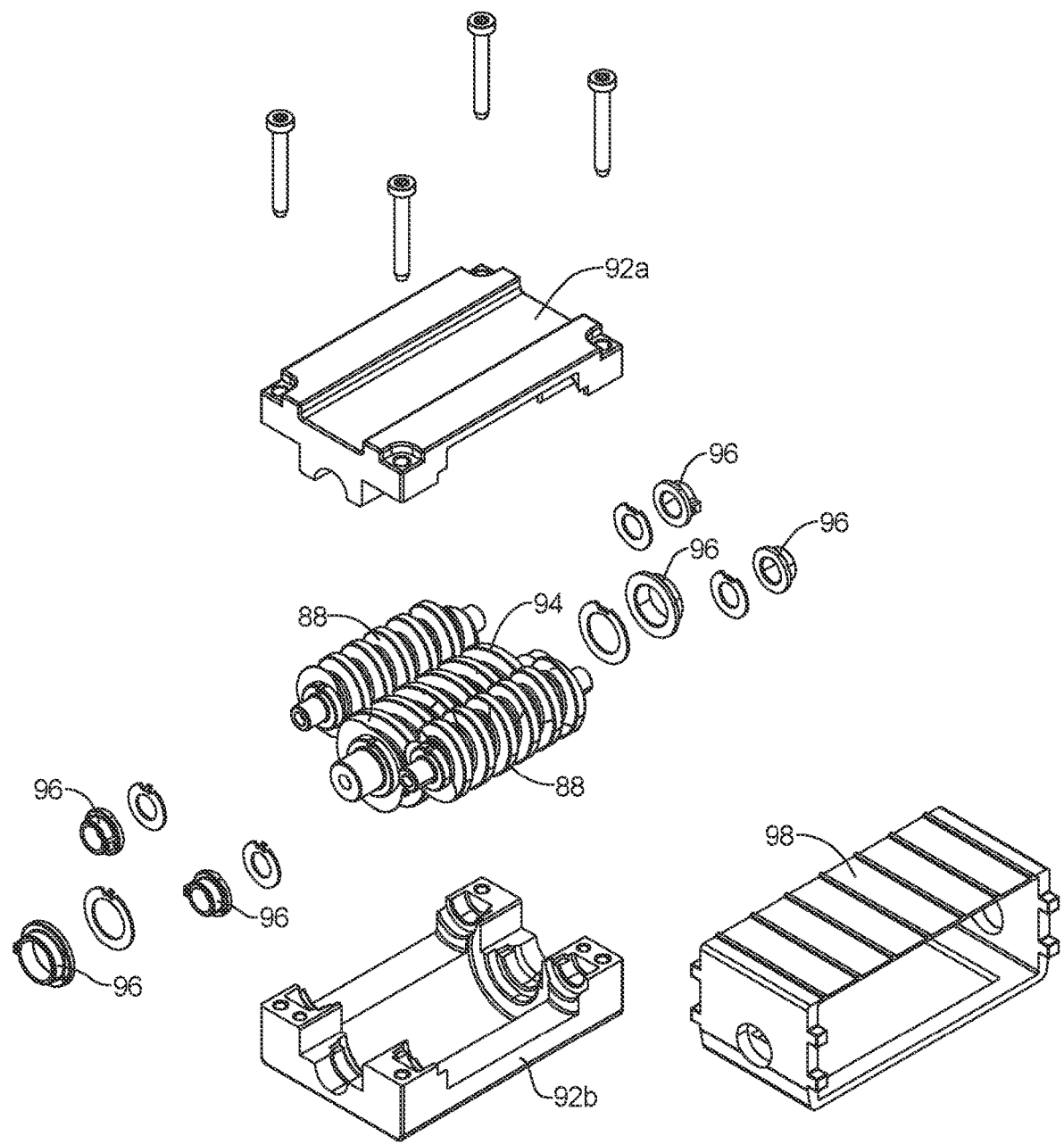
FIG. 22 is an exploded perspective view of a twin worm gear transmission according to the principles of the present disclosure.
Figure 23:
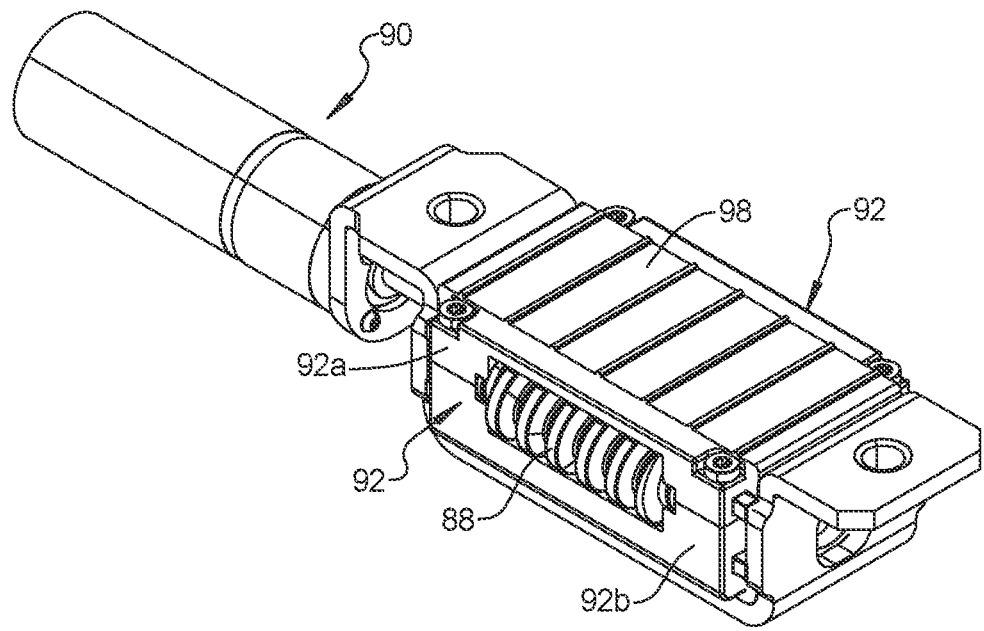
FIG. 23 is a perspective view of the twin worm gear transmission according to the principles of the present disclosure.
Figure 24:
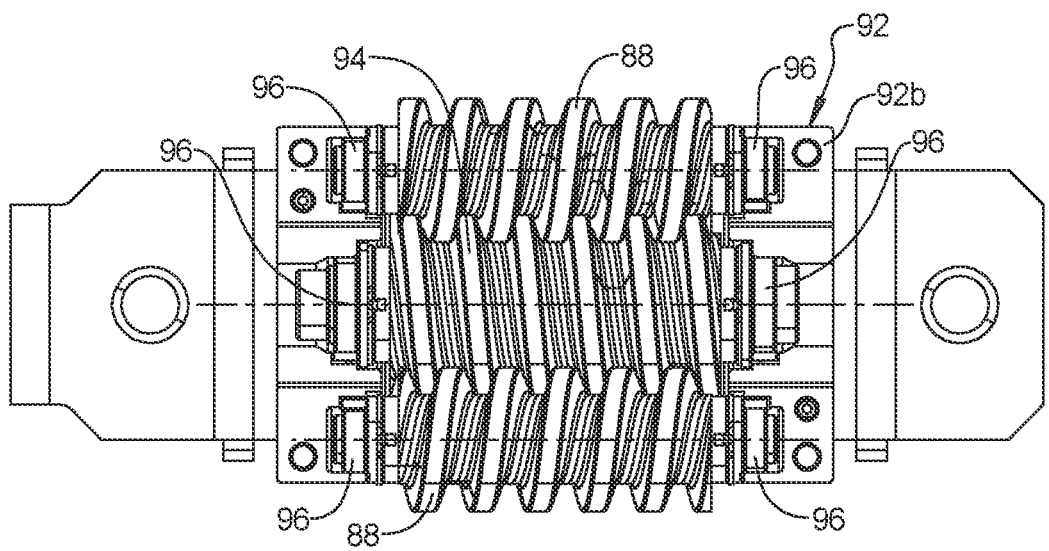
FIG. 24 is a top plan view of a twin worm gear system according to the principles of the present disclosure.
Figure 25:
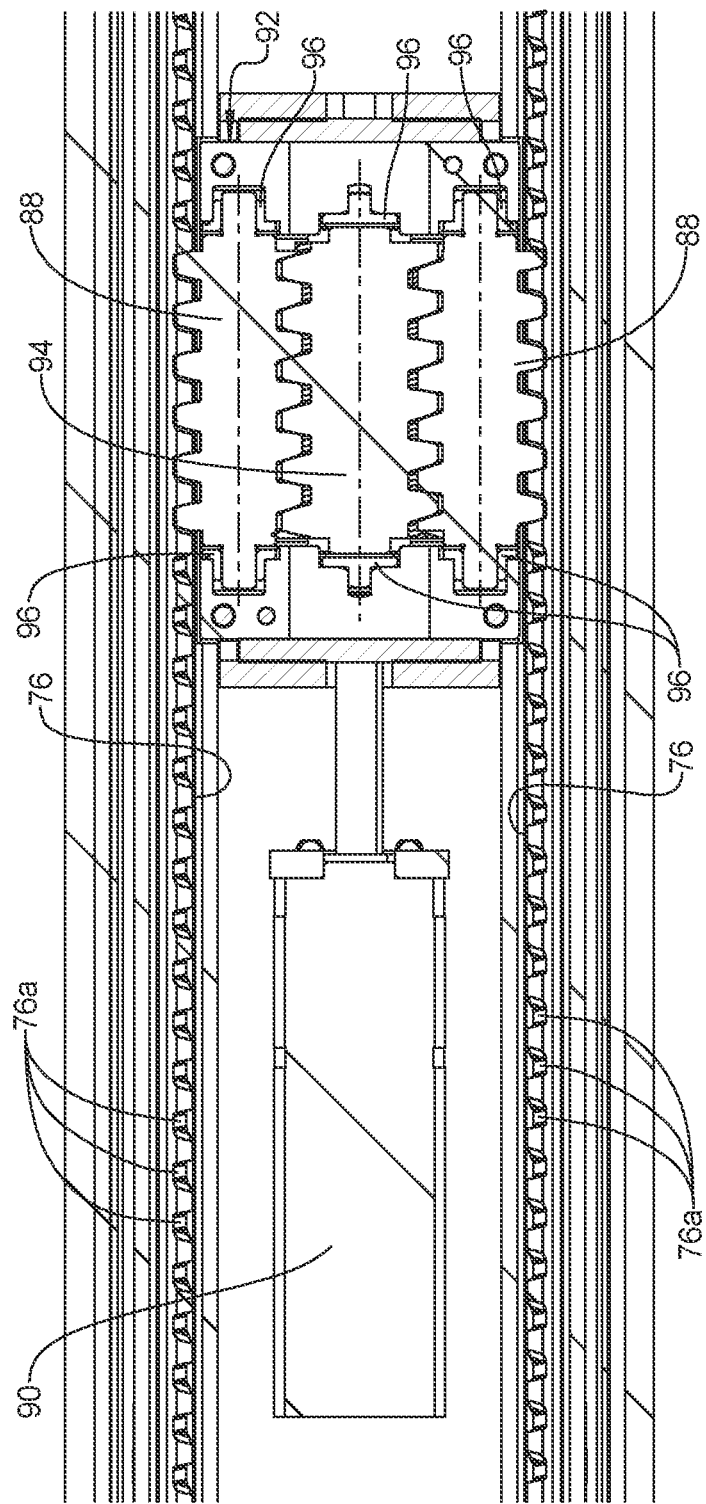
FIG. 25 is a top cut-away view of the twin worm gear system engaged with a twin-screw thread rack according to the principles of the present disclosure.

With reference to FIG. 20, the power length adjuster gear transmission 80 is mounted between the pair of side flanges 78b of the inner track 78. With reference to FIGS. 20 and 21, the power length adjuster gear transmission 80 rotatably supports a pair of twin drive worms 88 that are each drivingly engaged with a respective one of the pair of screw thread racks 76, as best shown in FIG. 25. With reference to FIGS. 21 and 23, a planetary gear motor 90 is mounted to a housing 92. With reference to FIGS. 22-24, the power length adjuster gear transmission 80 can include an input worm gear 94 connected to the planetary gear motor 90 and the pair of twin drive worm 88 are engaged with the input worm gear 94. The twin drive worm system 88 is self-locking to prevent movement of the transmission 80 unless driven by the planetary gear motor 90. The planetary gear motor 90 can include a brushless DC motor that drives an optional planetary gear system that is drivingly connected to the input worm gear 94. The housing 92 rotatably supports the input worm gear 94 and the pair of twin drive worms 88 via bearing assemblies 96 that can be made from plastic. The housing 92 can include upper and lower covers 92a, 92b that are bolted together and a rubber gearbox bearing 98, as best shown in FIG. 22.

With the power long rail system of the present disclosure, a smooth and quiet seat adjustment is provided with a very low, hidden profile and neatly compartmentalized moving parts completely integrated inside the outer tracks with maximized range of motion therein. The power tracks are completely mounted under the vehicle floor.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power rail system for a vehicle seat, comprising:
an outer track defining an elongated channel;
an elongated lead screw mounted in the channel;
an inner track received in the elongated channel; and
a power length adjuster gear transmission mounted to the inner track and drivingly engaged with the elongated lead screw,
wherein the inner track is supported within the channel by a roller bearing system, and
wherein the roller bearing system includes front and rear roller cage pairs disposed at a front and a rear end of the inner track, respectively.

2. The power rail system according to claim 1, wherein the inner track includes a pair of side flanges and the front and rear roller cage pairs are supported by the side flange of the inner track.

3. The power rail system according to claim 1, wherein the outer track includes a base and a pair of sidewalls, the pair of sidewalls each include a hook-shaped upper flange in cross-section.

4. The power rail system according to claim 3, wherein the inner track includes a pair of side flanges that are received in the hook-shaped upper flanges of the pair of sidewalls.

5. The power rail system according to claim 1, further comprising a pair of elongated carpet cover rails connected on opposite sides of the outer track.

6. The power rail system according to claim 1, wherein the inner track includes an upper wall and a pair of sidewalls and the power length adjuster gear transmission is mounted between the pair of sidewalls of the inner track.

7. The power rail system according to claim 1, wherein the power length adjuster gear transmission includes an input worm gear connected to a drive motor and an output worm nut disposed on the elongated lead screw and drivingly engaged with the input worm gear.

8. The power rail system according to claim 1, wherein the power length adjuster gear transmission includes an input helical gear connected to a drive motor and an output helical gear nut disposed on the elongated lead screw and drivingly engaged with the input helical gear.

9. The power rail system according to claim 1, wherein the elongated lead screw is mounted to a front attachment bracket and a rear attachment bracket each mounted to a base of the outer track.

10. A power rail system for a vehicle seat, comprising:
an outer track defining an elongated channel;
an elongated lead screw mounted in the channel;
an inner track received in the elongated channel; and
a power length adjuster gear transmission mounted to the inner track and drivingly engaged with the elongated lead screw,
wherein the power length adjuster gear transmission includes a herringbone input worm gear connected to a drive motor and an output herringbone worm nut disposed on the elongated lead screw and drivingly engaged with the herringbone input worm gear.

11. The power rail system according to claim 10, wherein the inner track is supported within the channel by a roller bearing system, and wherein the roller bearing system includes front and rear roller cage pairs disposed at a front and a rear end of the inner track, respectively.

12. The power rail system according to claim 11, wherein the inner track includes a pair of side flanges and the front and rear roller cage pairs are supported by the side flange of the inner track.

13. The power rail system according to claim 10, wherein the outer track includes a base and a pair of sidewalls, the pair of sidewalls each include a hook-shaped upper flange in cross-section, and wherein the inner track includes a pair of side flanges that are received in the hook-shaped upper flanges of the pair of sidewalls.

14. The power rail system according to claim 10, further comprising a pair of elongated carpet cover rails connected on opposite sides of the outer track.

15. The power rail system according to claim 10, wherein the inner track includes an upper wall and a pair of sidewalls and the power length adjuster gear transmission is mounted between the pair of sidewalls of the inner track.

16. A power rail system for a vehicle seat, comprising:
an outer track defining an elongated channel with a pair of sidewalls each including an integrally formed screw thread rack;
an inner track received in the elongated channel; and
a power length adjuster gear transmission mounted to the inner track and drivingly engaged with the screw thread racks on each of the pair of sidewalls,
wherein the inner track is supported within the channel by a roller bearing system, and
wherein the roller bearing system includes front and rear roller cage pairs disposed at a front and a rear end of the inner track, respectively.

17. The power rail system according to claim 16, wherein the outer track includes a base disposed between the pair of sidewalls, the pair of sidewalls each include a hook-shaped upper flange in cross-section.

18. The power rail system according to claim 16, further comprising a pair of elongated carpet cover rails connected on opposite sides of the track.

19. The power rail system according to claim 16, wherein the inner track includes an upper wall and a pair of sidewalls and the power length adjuster gear transmission is mounted between the pair of sidewalls of the inner track.

20. The power rail system according to claim 16, wherein the power length adjuster gear transmission includes an input worm gear connected to a drive motor and a pair of twin drive worms drivingly engaged with the input worm gear and a respective one of the screw thread racks of the pair of sidewalls of the outer track.

* * * * *